US011834051B2

United States Patent
Xu et al.

(10) Patent No.: US 11,834,051 B2
(45) Date of Patent: Dec. 5, 2023

(54) METHODS AND SYSTEMS FOR SEQUENTIAL MICRO-ACTIVITY BASED DRIVER DETECTION ON SMART DEVICES

(71) Applicant: HUAWEI TECHNOLOGIES CO., LTD., Shenzhen (CN)

(72) Inventors: Yurong Xu, Sunnyvale, CA (US); Joseph Munaretto, Redwood City, CA (US); Jun Yang, Milpitas, CA (US); Juan Chen, Campbell, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/270,672

(22) PCT Filed: Feb. 14, 2020

(86) PCT No.: PCT/US2020/018346
§ 371 (c)(1),
(2) Date: Feb. 23, 2021

(87) PCT Pub. No.: WO2020/168229
PCT Pub. Date: Aug. 20, 2020

(65) Prior Publication Data
US 2021/0370952 A1 Dec. 2, 2021

Related U.S. Application Data

(60) Provisional application No. 62/805,372, filed on Feb. 14, 2019.

(51) Int. Cl.
*G08B 21/00* (2006.01)
*B60W 40/08* (2012.01)
(Continued)

(52) U.S. Cl.
CPC ............... *B60W 40/08* (2013.01); *B60L 3/12* (2013.01); *B60W 40/10* (2013.01); *B60W 2540/223* (2020.02)

(58) Field of Classification Search
CPC ................. B60W 40/08; B60W 40/10; B60W 2540/223; B60L 3/12
(Continued)

(56) References Cited

U.S. PATENT DOCUMENTS 5,765,803 A * 6/1998 Graham ................. B60N 2/544
267/221
9,908,531 B1 * 3/2018 Claywell ............... B60W 10/30
(Continued)

FOREIGN PATENT DOCUMENTS

| CN | 106293032 A | 1/2017 |
| CN | 107636683 A | 1/2018 |

(Continued)

OTHER PUBLICATIONS

Extended European Search Report issued in European Application No. 20754959.3 dated Jan. 18, 2022, 8 pages.
(Continued)

*Primary Examiner* — Naomi J Small
(74) *Attorney, Agent, or Firm* — Fish & Richardson P.C.

(57) ABSTRACT

Methods, systems, and apparatus, including computer programs encoded on computer storage media for driver detection are described. One example method includes monitoring data provided by an accelerometer associated with a client device. It is determined whether the data indicates a particular event associated with a vehicle. In response to determining that the data indicates the particular event associated with the vehicle, one or more micro-activities associated with the vehicle are determined based on data from at least one of the accelerometer and one or more other
(Continued)

sensors associated with the client device. Results from each of the one or more micro-activities are provided to a trained model associated with the client device. In response to providing the results to the trained model, one or more vehicular events in a time sequence are identified based on the one or more micro-activities associated with the vehicle.

18 Claims, 23 Drawing Sheets

(51) Int. Cl.
 *B60L 3/12* (2006.01)
 *B60W 40/10* (2012.01)
(58) Field of Classification Search
 USPC .......................................................... 340/540
 See application file for complete search history.

(56) References Cited

U.S. PATENT DOCUMENTS

| | | | | |
|---|---|---|---|---|
| 10,121,494 | B1* | 11/2018 | Sundaram | G10L 25/30 |
| 2004/0075532 | A1* | 4/2004 | Ueda | E05B 77/48 |
| | | | | 340/5.72 |
| 2012/0036097 | A1 | 2/2012 | Prokhorov | |
| 2014/0180730 | A1 | 6/2014 | Cordova et al. | |
| 2015/0087264 | A1* | 3/2015 | Goyal | H04W 4/027 |
| | | | | 455/411 |
| 2015/0091740 | A1* | 4/2015 | Bai | B60K 37/06 |
| | | | | 340/901 |
| 2015/0120336 | A1 | 4/2015 | Grokop et al. | |
| 2015/0369197 | A1* | 12/2015 | Cunningham | F02N 11/0818 |
| | | | | 701/113 |
| 2016/0016590 | A1 | 1/2016 | Fernandez Pozo et al. | |
| 2016/0036964 | A1 | 2/2016 | Barfield, Jr. et al. | |
| 2017/0058588 | A1* | 3/2017 | Wheeler | E05F 15/77 |
| 2017/0124480 | A1 | 5/2017 | Sarkar et al. | |
| 2017/0147935 | A1* | 5/2017 | Bai | B60R 16/037 |
| 2018/0033220 | A1* | 2/2018 | Pal | G07C 5/0866 |
| 2018/0053108 | A1 | 2/2018 | Olabiyi et al. | |
| 2018/0174457 | A1* | 6/2018 | Taylor | G08G 1/0962 |
| 2018/0206090 | A1 | 7/2018 | Matus et al. | |
| 2019/0005412 | A1* | 1/2019 | Matus | G06Q 30/0201 |
| 2020/0086881 | A1* | 3/2020 | Abendroth | G10L 17/00 |

FOREIGN PATENT DOCUMENTS

| | | |
|---|---|---|
| CN | 108733026 A | 11/2018 |
| EP | 3382570 A1 | 10/2018 |
| TW | 200912814 A | 3/2009 |
| WO | 2017033014 A2 | 3/2017 |

OTHER PUBLICATIONS

Zhang et al., "Modeling the Heterogeneous Duration of User Interest in Time-Dependent Recommendation: A Hidden Semi-Markov Approach," IEEE Transactions on Systems, Man and Cybernetics: Systems, vol. 48, No. 2, Feb. 2018, 18 pages.
Fang et al., "Safety State Awareness, Fusion and Prediction of Cross-barrier Buildings," Chapter 5, Dec. 2018, pp. 245-263 (with English translation).
Office Action in Chinese Appln. No. 202080008503.7, dated Feb. 17, 2023, 7 pages.
Office Action in Chinese Appln. No. 202080008503.7, dated Nov. 29, 2022, 9 pages.
EP Communication Pursuant to Article 94(3) EPC in European Appln No. 20754959.3, dated May 16, 2023, 4 pages.

* cited by examiner

METHODS AND SYSTEMS FOR SEQUENTIAL MICRO-ACTIVITY BASED DRIVER DETECTION ON SMART DEVICES

This application is a National Stage Application under 35 U.S.C. § 371 and claims the benefit of International Application No. PCT/US2020/018346, filed Feb. 14, 2020, which claims the benefit of U.S. Provisional Application No. 62/805,372, filed on 14 Feb. 2019.

TECHNICAL FIELD

The present disclosure relates to driver detection, and more specifically to sequential micro-activity based driver detection on smart devices

BACKGROUND

Automobiles have changed significantly since their introduction. The pace of improvements in automobiles is increasing, especially related to advancements to combat their negative impacts. In the coming years, the automotive industry is expected to progress even further, taking us one step closer to a more connected and digitized environment. Driver assistance systems are an important part of the industry.

SUMMARY

This disclosure proposes a method performed by a smart electric device (i.e. smartphone) to collect detection results of an activity detection (or getting in/out car detection) of a user holding or carrying the smart electric device, a user location detection in a car, and a driving feature detection of the car, and determine whether the user is a driver based on a series of activity detection results. Any of the activity detection, the user location detection, and the driving feature detection may be performed by one or more inertial sensors within the smart electric device. In some cases, any of the activity detection, the user location detection, and the driving feature detection may be performed by one or more sensors in the car and reported by a car system to the smart electric device. The method may be further based on a detection of other aspects such as a location of the device (i.e., pocket of the user, a cup holder, or a phone holder). The method may further include a false-alarm elimination function which can be based on sleeping time exclusion, automotive Bluetooth detection, fixed WiFi access point (AP) detection (at home or in office), taxi usage detection, pocket detection, holster detection, etc.

In a first implementation, a method includes: monitoring data provided by an accelerometer associated with the client device; determining whether the data indicates a particular event associated with a vehicle; in response to determining that the data indicates the particular event associated with the vehicle, determining one or more micro-activities associated with the vehicle based on data from at least one of the accelerometer and one or more other sensors associated with the client device; providing results from each of the one or more micro-activities to a trained model associated with the client device; and in response to providing the results to the trained model, identifying one or more vehicular events in a time sequence based on the one or more micro-activities associated with the vehicle.

In a second implementation, an electronic device includes: anon-transitory memory storage comprising instructions; and one or more hardware processors in communication with the memory storage, wherein the one or more hardware processors execute the instructions to perform operations including: monitoring data provided by an accelerometer associated with the client device; determining whether the data indicates a particular event associated with a vehicle; and in response to determining that the data indicates the particular event associated with the vehicle, determining one or more micro-activities associated with the vehicle based on data from at least one of the accelerometer and one or more other sensors associated with client device; providing results from each of the one or more micro-activities to a trained model associated with the client device; and in response to providing the results to the trained model, identifying one or more vehicular events in a time sequence based on the one or more micro-activities associated with the vehicle.

In a third implementation, a non-transitory computer-readable medium storing computer instructions, that when executed by one or more hardware processors, cause the one or more hardware processors to perform operations including: monitoring data provided by an accelerometer associated with the client device; determining whether the data indicates a particular event associated with a vehicle; and in response to determining that the data indicates the particular event associated with the vehicle, determining one or more micro-activities associated with the vehicle based on data from at least one of the accelerometer and one or more other sensors associated with the client device; providing results from each of the one or more micro-activities to a trained model associated with the client device; and in response to providing the results to the trained model, identifying one or more vehicular events in a time sequence based on the one or more micro-activities associated with the vehicle.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method and the instructions stored on the non-transitory, computer-readable medium.

The details of one or more implementations of the subject matter of this specification are set forth in the accompanying drawings and the description. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Automobiles have changed significantly since their introduction. The pace of improvements in automobiles is increasing, especially related to advancements to combat their negative impacts. In the coming years, the automotive industry is expected to progress even further, taking us one step closer to a more connected and digitized environment. Driver assistance systems are an important part of the industry. In some cases, cameras are embodied in a vehicle and provide a driver detection solution. The driver assistance system employs special sensors inside the vehicle, such as pressure sensors on vehicle seats to measure the weight of a person on the driver seat and detect the existence of the driver. In some cases, the driver assistance system can employ GPS (Global Position System) to detect a precise location of the user and the vehicle to determine whether the user is inside the vehicle.

The present disclosure proposes a technique that utilizes multiple sensors embedded in a mobile device, such as a smartphone, to detect whether its user is entering a vehicle. In some cases, if the user is detected to be inside the vehicle, the mobile device may detect its location inside the vehicle (such as sitting in the front row seat or back row seat, right seat or left seat) to differentiate between the driver and passenger. Other motion status can also be detected by the mobile device to determine whether the user is driving the vehicle or not and when the user is getting out of the vehicle. The present disclosure harnesses various sensors embedded in a smart device and describes different detection features to differentiate corresponding micro-activities related to the driving event. Furthermore, a state machine as described herein emulates a series of activities involved in on/off car (or vehicle) detection, and a sensor-fusion feature as described herein can improve the accuracy of driver detection and decrease the possibility of false alarm.

In some embodiments, the present disclosure describes a technology of using existing IMU (Inertial Measurement Unit) sensors in current smart devices to implement entering/exiting car detection, driving detection, and driver location detection. Besides IMU sensors, ambient light sensors (including ToF (Time of Flight) sensors), pressure sensors, Bluetooth, and WiFi, which is available inside a smartphone, can be contributed to eliminating false alarm via sensor fusion. Note that the embodiments of the present disclosure are not limited to smartphones. The embodiments can be applied in any suitable wearable devices that employ IMU sensors and/or other additional sensors.

Figure 1:
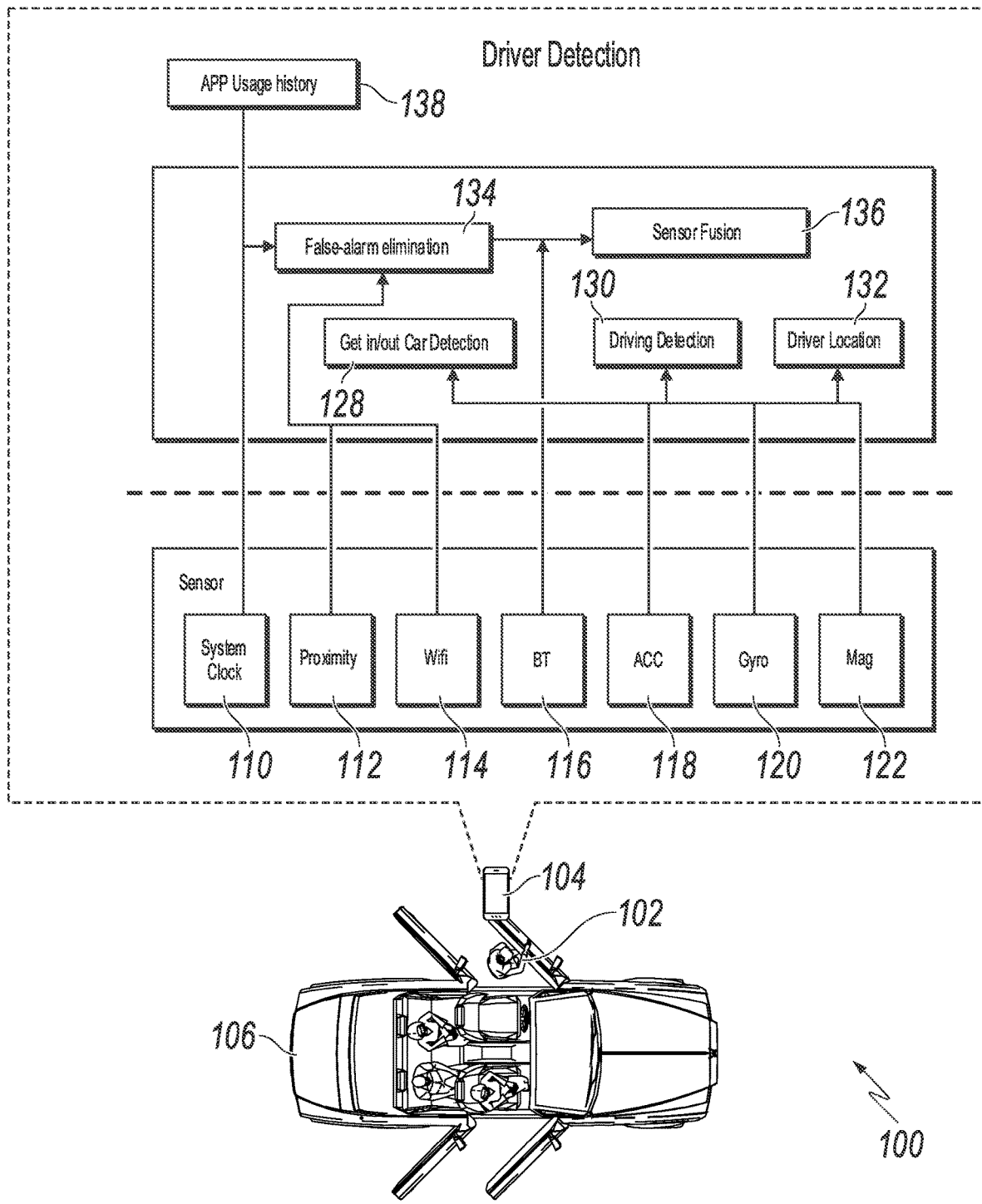
FIG. 1 shows an example driver detection system according to an embodiment of the present disclosure.

FIG. 1 shows an example of driver detection system 100 according to an embodiment of the present disclosure. In some cases, the driver detection system 100 can detect and trace a series of micro-activities involved before, after, and at the time when a user (e.g., user 102) is driving a car (e.g., car 106). In some examples, detection of the micro-activities includes detecting whether the user is walking or not, whether the user is turning around or not, whether the smartphone is mounted on the cup holder or a phone holder of the car, and whether the user is inside the car. The driver detection system 100 further includes a get in/out car detection component 128, a driving detection component 130, and a driver location detection component 132 to analyze data collected by various sensors to trace the micro-activities of the user 102. In some cases, the driver detection system 100 may utilize IMU sensors inside a smart device 104 (e.g., a smartphone) to detect the micro-activities of the user. In some cases, those micro-activities can be stored in a time-decayed buffer. In some cases, the driver detection system 100 can train a model using the micro-activities to detect whether a user is entering the car, whether the user is driving the car, etc. The IMU sensor might be any or combination of ACC 118 (accelerometer), Gyro (Gyroscope) sensor 120, or Mag (Magnetic) sensor 122. In some cases, the driver detection system 100 further includes ToF sensors that can determine whether the smartphone is inside the pocket or on the hand of the user so that the corresponding models could be applied to improve the overall accuracy of recognition/detection.

As shown, the driver detection system 100 further includes a system clock 110, a proximity sensor 112, a WiFi module 114, and a BT (Bluetooth) module 116. In some cases, these components can detect and collect information including the day time/night time, a distance between the smartphone and user, connection of fixed WiFi access points, signal strength and SSID (service set identifier) of WiFi and BT. Such information as well as application usage data collected by the application usage history component 138, can be used by the false-alarm elimination component 134 and the sensor fusion component 136 to improve the accuracy and decrease the false-alarms of the driver detection methods as described in the disclosure.

Figure 2:
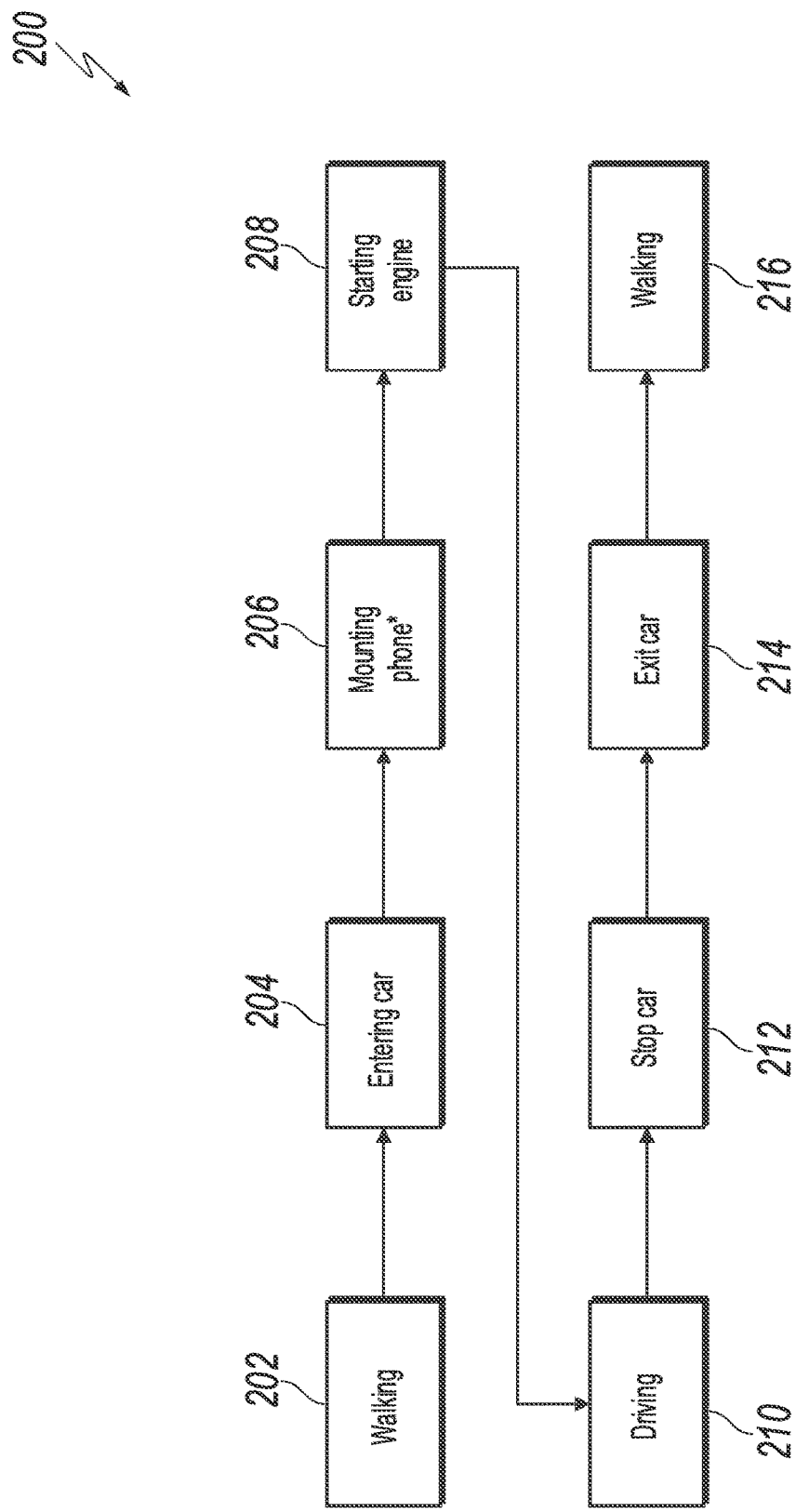
FIG. 2 shows an example of a series of micro-activities for driver detection according to an embodiment of the present disclosure.

As noted, driver detection as described herein involves a series of micro-activities, such as a user walking to a car, then entering the car, starting engine, driving, and getting off the car. FIG. 2 shows an example of a series of micro-activities 200 for driver detection according to an embodiment of the present disclosure. As shown, the micro-activities 200 includes walking 202, entering car 204, mounting phone 206, starting engine 208, driving 210, stopping car 212, exiting car 214, and walking 216.

Figure 3:
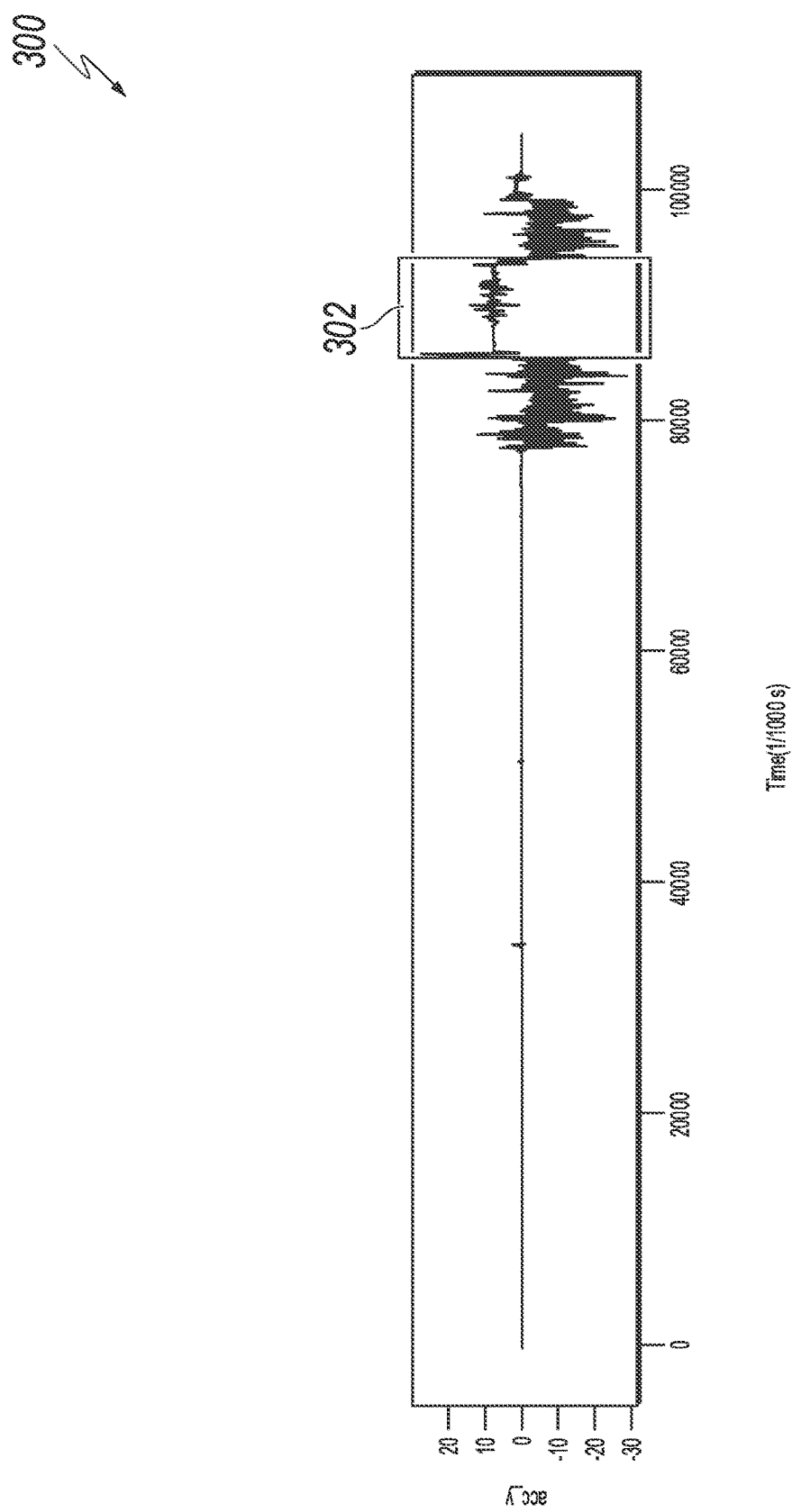
FIG. 3 shows an example of accelerometer data of a user's activities in a predetermined time duration according to an embodiment of the present disclosure.

In some cases, the driver detection can be set to "always on" in the device to sense the daily life of a user. FIG. 3 shows an example of accelerometer data 300 of a user's activities in a predetermined time duration. In this example, the accelerometer data 300 (with a unit of 10 m/s$^2$ in the vertical axis) is generated within a time duration of approximately 100 seconds from a smart device (e.g., a smartphone) with a user in a classic driving event. As shown, the straight line up until 77th second indicates that the user may not be moving. The part of the accelerometer data between 78$^{th}$ second and 85$^{th}$ second right before the box 302 indicates that the user may be walking forward to the car until sitting inside the car. The part of the accelerometer data in the box 302 indicates that the user may be driving the car. The part of the accelerometer data after the box 302 indicates that the user may have finished driving and moves out of the car.

Figure 4:
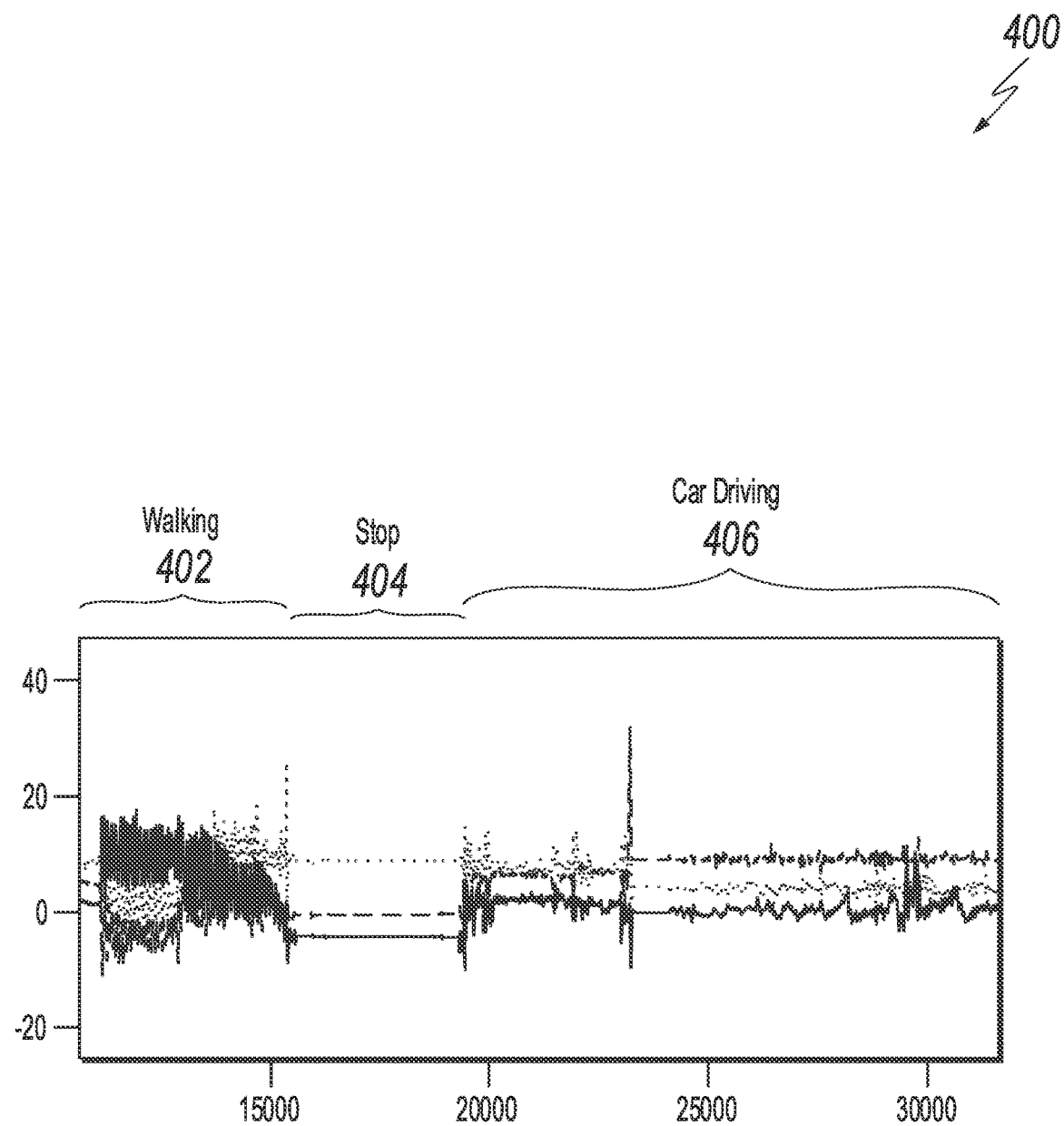
FIG. 4 shows an example of driving event detection according to an embodiment of the present disclosure.

FIG. 4 shows an example of driving event detection according to an embodiment of the present disclosure. In this example, accelerometer data 400 indicates patterns of micro-activities in x, y, and z axes (shown as three lines in the graph). In some cases, a driving event may happen in a short time with a sequence of micro-activities of walking 402, stopping 404, and car driving 406 as shown in the accelerometer data 400. In some cases, the walking micro-activity 402 includes features indicating oscillation swing movement from the four limbs of a user. The stopping micro-activity 404 may include features indicating that the user is already inside the car and that there is no big swing movement. The car driving micro-activity 406 may include features that indicate car vibration when the car is started and that indicate car vibration from driving and car turning, etc.

In some cases, a method of detecting a driving event may include segmenting a potential event of driving from real-time sensor data streaming from the accelerometer. Multiple individual feature detection modules may use various sensors to detect corresponding micro-activities. Each detection result for micro-activities may be timestamped and imported into a time decaying embedded state machine. In some examples, the time decaying embedded state machine may be a Hidden Markov Model (HMM) state machine. In some cases, based on a model trained from training data, the state machine may output different states. In some examples, the states may be generated as "CarIn," "IsDriver," "Driving," and "CarOut," where "CarIn" indicates whether the user is in the car, "IsDriver" indicates whether the user is a driver, "Driving" indicates whether the user is driving, and "CarOut" indicates whether the user is out of the car.

Figure 5:
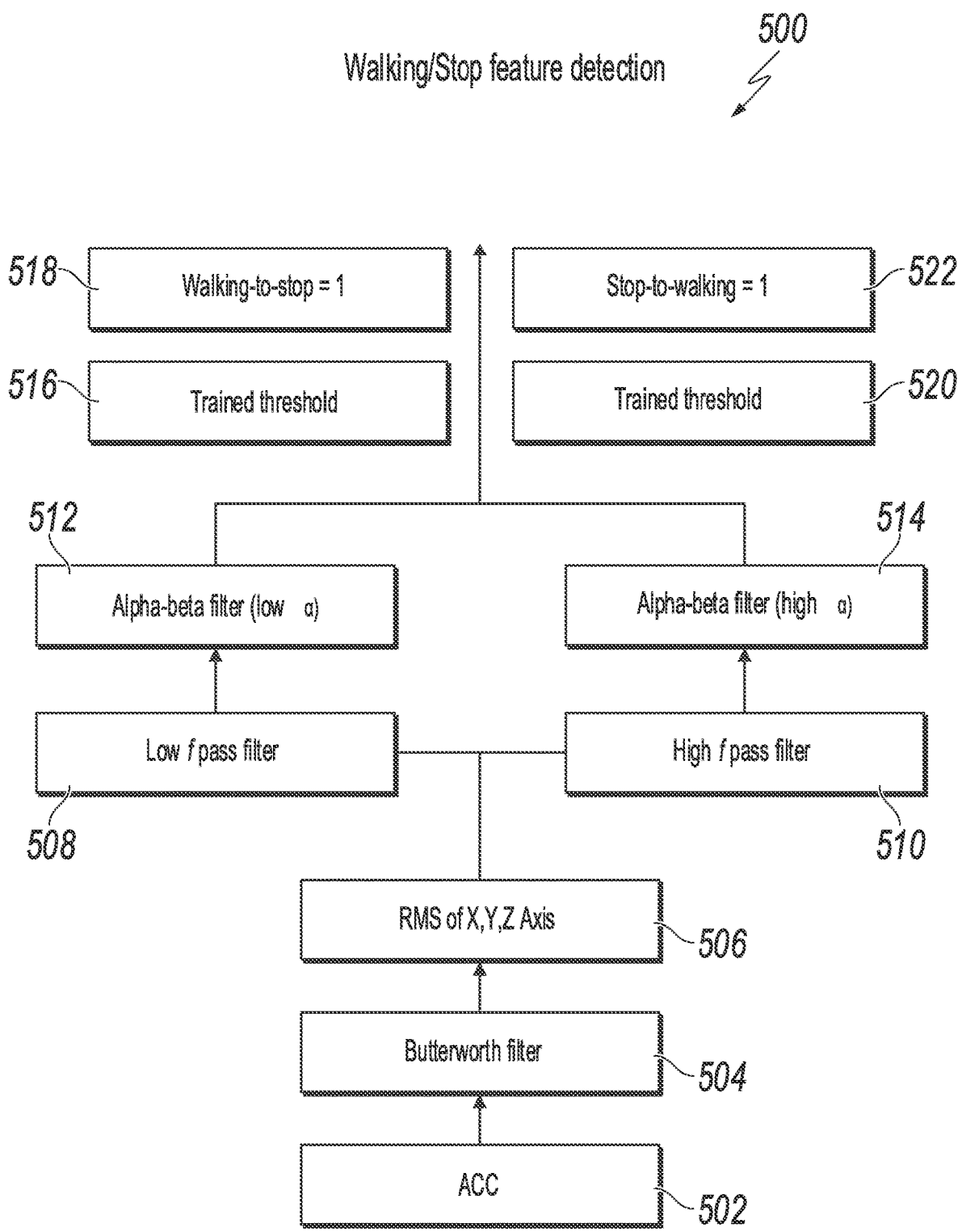
FIG. 5 shows a flow chart illustrating an example of a "Walking/Stop" feature detection method according to an embodiment of the present disclosure.

In some cases, an example method of driver detection as described herein includes identifying a start point of a potential driving event. In one example, a new segmentation method may be adapted to detect different features of human movement between walking and stop. FIG. 5 shows a flow chart illustrating an example of a "Walking/Stop" feature detection method 500 to detect "walking-to-stop" and "stop-to-walking" features.

Process 500 starts at step 502 where raw signals from accelerometer are received. In some cases, the raw accelerometer signal includes an acceleration value indicating a proper acceleration of the smart device. In one example with reference to FIG. 6, some walking patterns may be identified in the raw accelerometer signal. In some cases, the raw accelerometer signal is sampling at a constant frequency. In one example, the accelerometer signal may be generated at a sampling rate of 50 Hz. In some examples, the accelerometer signal may be generated at other sampling rates, e.g., 100 Hz, or even up to 500 Hz, depending on a model of the smart device as well as the supporting of hardware. In some cases, the accelerometer signal may be generated at any suitable sampling rate, e.g., a sampling rate of at least 50 Hz or less than 500 Hz. In some cases, a higher frequency may result in more accurate detection of pattern recognition for the micro-activities.

At 504, a Butterworth filter is applied on the accelerometer signal to generate a filtered signal. In some cases, the Butterworth filter is used to smooth the accelerometer signal.

At 506, a Root Mean Square (RMS) operation is performed on the filtered signal. In one example, the Root Mean Square (RMS) operation is performed with respect to the x, y, and z-axis of the motion. In some cases, the RMS operation is performed to normalize the orientation of the motion of the smart device. In some cases, a normalized signal is generated after the RMS operation.

At 508, a low frequency pass filter is applied to the normalized signal. In some cases, the low frequency pass filter is used to detect the main body movement (e.g., body movement when walking). In one example, the low frequency pass filter has a cut-off frequency of 3 Hz.

At 510, a high frequency pass filter is applied to the normalized signal. In some cases, the high frequency pass filter is used to detect activities such as hand movement. In one example, the high frequency pass filter has a cut-off frequency of 10 Hz.

In some cases, the results from the low frequency pass filter and the high frequency pass filter may be normalized. In some cases, after normalizing the results from the low frequency pass filter and the high frequency pass filter, the normalized results may be imported into two alpha-beta filters.

At 512, a first alpha-beta filter is applied to the result from the low frequency pass filter. In some cases, the first alpha-beta filter has a low alpha value. In some cases, the value of low/high alpha is trained based on collected data.

At 514, a second alpha-beta filter is applied to the result from the high frequency pass filter. In some cases, the second alpha-beta filter has a high alpha value. In one example, the second alpha-beta filter has an alpha value that is higher than the alpha value of the first alpha-beta filter.

With two separate alpha-beta filters with one small alpha and one relatively large alpha value, it can be determined whether and when the user stops walking.

In some cases, a result from the first alpha-beta filter (with a low alpha value) is compared with a result from the second alpha-beta filter (with a high alpha value). In some cases, if the result from the first alpha-beta filter is higher than the result from the second alpha-beta filter and the difference between the two results is higher than a trained threshold 516, it may be determined that a potential walking-to-stop event 518 is detected. In some cases, if the result from the second alpha-beta filter is higher than the result from the first alpha-beta filter and the difference between the two results is higher than a trained threshold 520, it may be determined that a potential stop-to-walking event 522 is detected.

Figure 6:
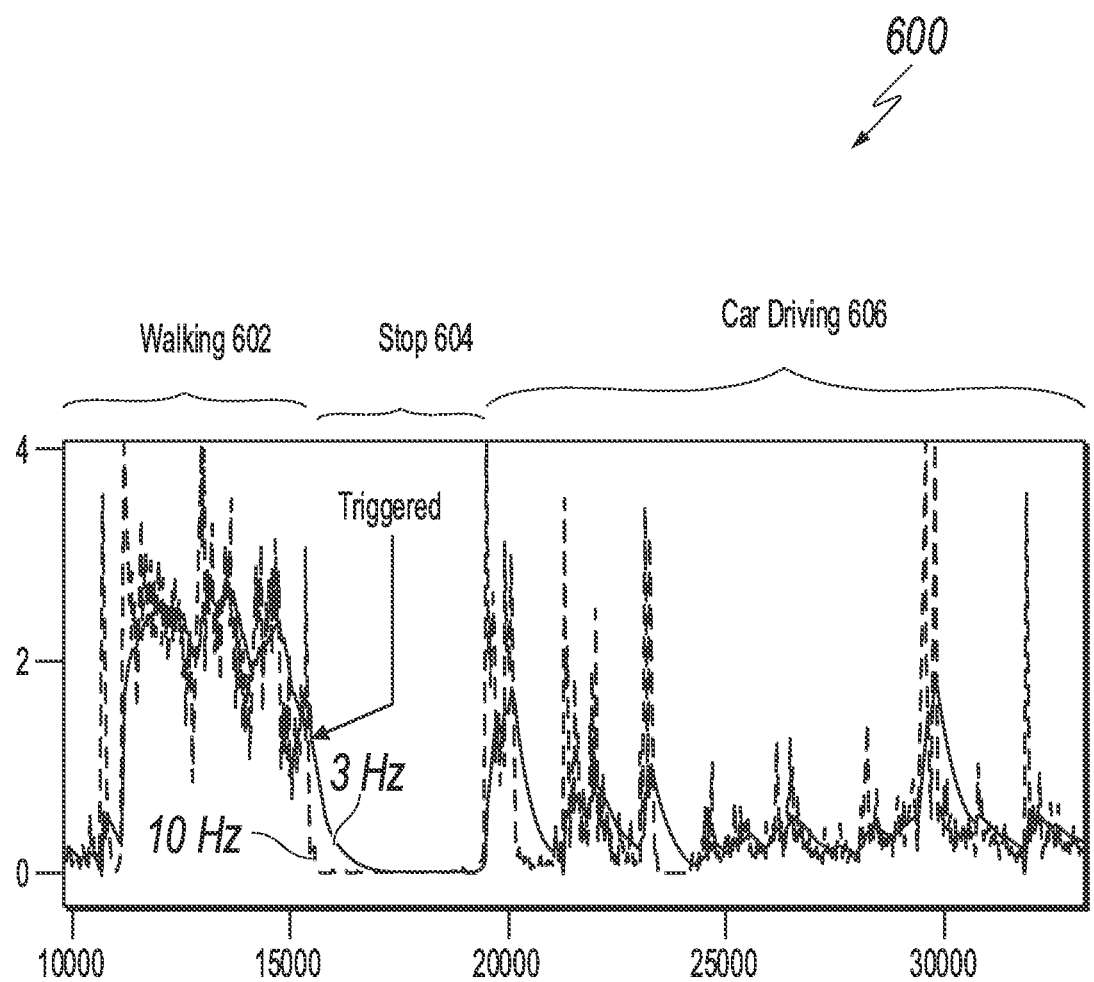
FIG. 6 shows an example of walking-to-stop and stop-to-walking detection according to an embodiment of the present disclosure.

FIG. 6 shows an example of walking-to-stop and stop-to-walking detection according to an embodiment of the present disclosure. In this example, graph 600 indicates patterns of micro-activities of walking 602, stop 604, and car driving 606 from filtered accelerometer data. In some cases, two filters (e.g., a low frequency pass filter and a high frequency pass filter) are applied on accelerometer data, where one filter smooths the accelerometer data more than the other due to a lower cut-off frequency. In this example, an output from a low frequency pass filter having a cut-off frequency of 3 Hz and an output from a high frequency pass filter having a cut-off frequency of 10 Hz are shown in graph 600. In some cases, when the output from the low-pass frequency filter is higher than a first predetermined threshold and when the output from the high-pass frequency filter is lower than a second predetermined threshold, it may be determined that a walking-to-stop event is detected. In this example as shown, when the output from the low-pass frequency filter of 3 Hz is higher than 1.0 and when the output from the high-pass frequency filter of 10 Hz is lower than 0.5 (indicated by "triggered" in the figure), it may indicate that the user has stopped but maintains memory of walking and it can be determined that a walking-to-stop event has been detected.

Figure 7:
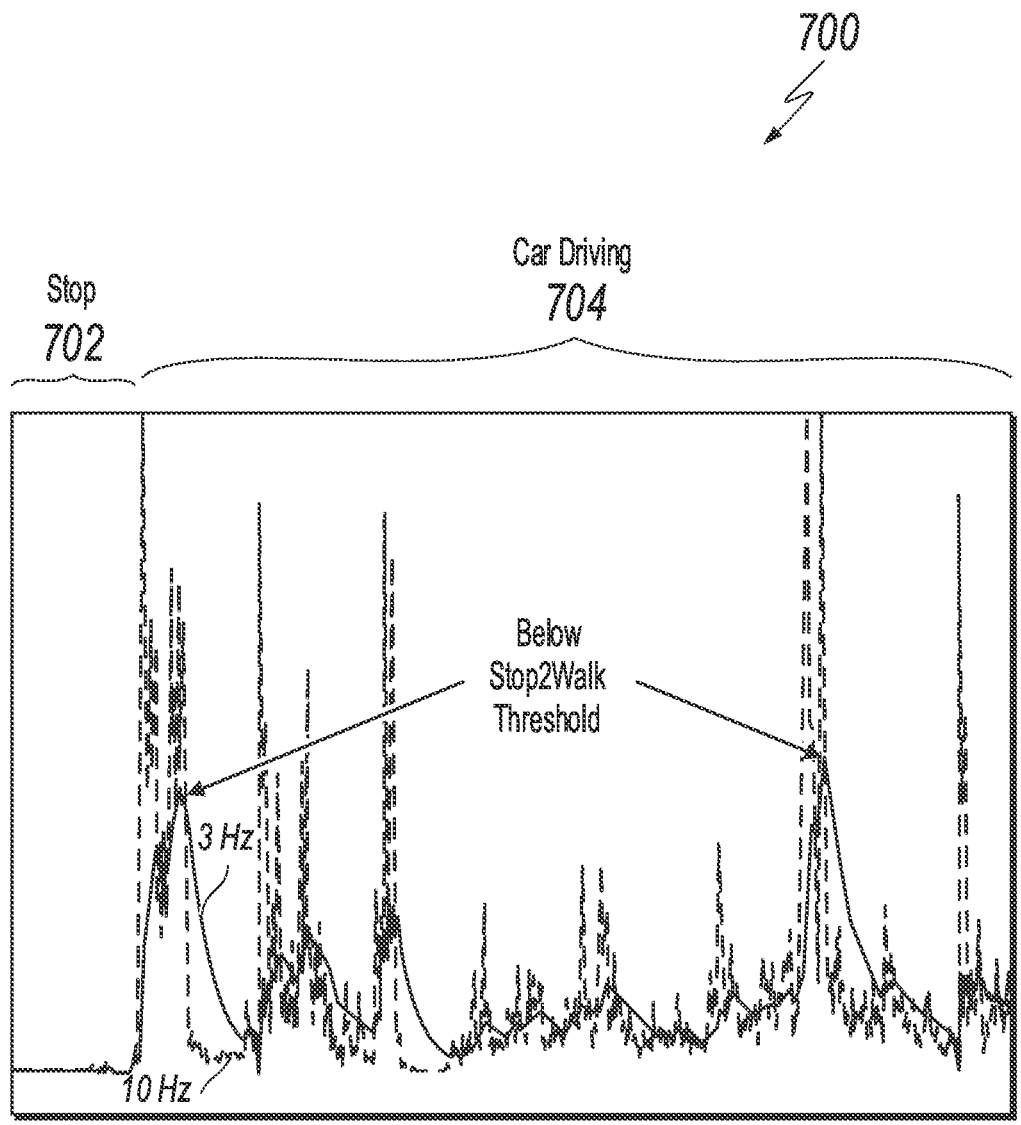
FIG. 7 shows another example of walking-to-stop and stop-to-walking detection according to an embodiment of the present disclosure.

FIG. 7 shows another example of walking-to-stop and stop-to-walking detection according to an embodiment of the present disclosure. In this example, accelerometer data 700 indicates patterns of micro-activities of stop 702 and car driving 704. In some cases, two filters (e.g., a low frequency pass filter and a high frequency pass filter) are applied on accelerometer data, where one filter smooths the accelerometer data more than the other due to a lower cut-off frequency. In this example, similar to FIG. 6, the low frequency pass filter has a cut-off frequency of 3 Hz, and the high frequency pass filter has a cut-off frequency of 10 Hz. In some cases, when both the output from the low-pass frequency filter and the output from the high-pass frequency filter are lower than a predetermined threshold, it may be determined that neither a walking-to-stop event nor a stop-to-walking event is detected. In this example, when both the output from the low-pass frequency filter and the output from the high-pass frequency filter are lower than 1.5 (indicated by "Below Stop2Walk Threshold" in the figure), it can be determined that neither a stop-to-walking event nor a walking-to-stop event is detected when the user is driving. In some examples, other thresholds, e.g., a threshold of 8.0, may also be used for the detection.

Figure 8:
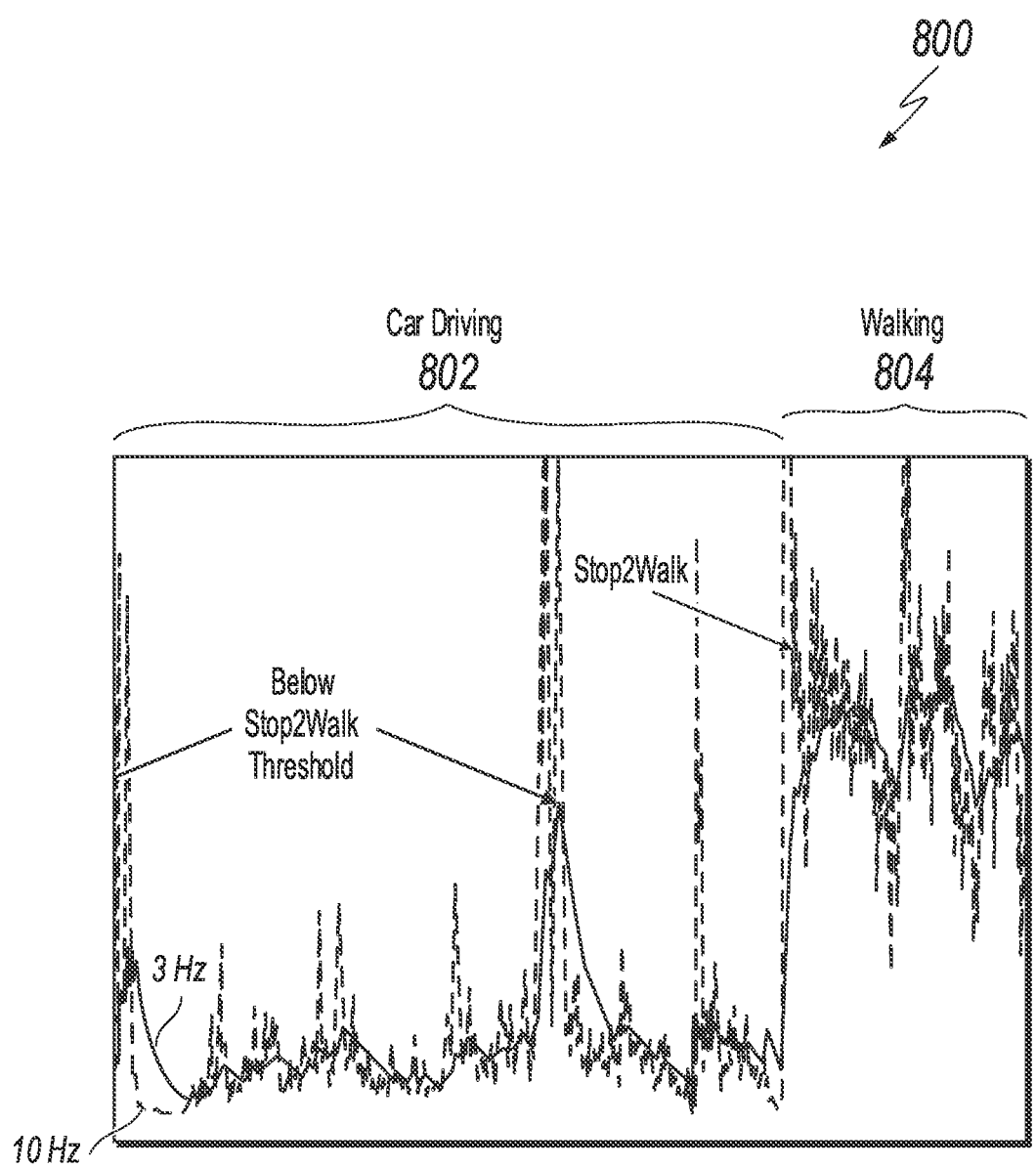
FIG. 8 shows another example of walking-to-stop and stop-to-walking detection according to an embodiment of the present disclosure.

FIG. 8 shows another example of walking-to-stop and stop-to-walking detection according to an embodiment of the present disclosure. In this example, accelerometer data 800 indicates patterns of micro-activities of car driving 802 and walking 804. In some cases, two filters (e.g., a low frequency pass filter and a high frequency pass filter) are applied on accelerometer data, where one filter smooths the accelerometer data more than the other due to a lower cut-off frequency. In this example, similar to FIGS. 6-7, the low frequency pass filter has a cut-off frequency of 3 Hz, and the high frequency pass filter has a cut-off frequency of 10 Hz. In some cases, when both the output from the low-pass frequency filter and the output from the high-pass frequency filter are higher than a predetermined threshold, it may be determined that a stop-to-walking event is detected. In this example, when both the output from the low-pass frequency filter and the output from the high-pass frequency filter are higher than 2.0 (indicated by "Stop2Walk" in the figure), it can be determined that a stop-to-walking event is detected.

In some cases, after the "walk/stop" detection as described above, a time sequence embedded state machine may be used to detect multiple events in a time sequence for the driver detection. In some cases, the time sequence embedded state machine can embed a time sequence information to each event. In one example, the time sequence embedded state machine can be a time sequence embedded hidden Markov model (HMM) state machine. In some cases, a final probability of each event is the combination of the probability of the event and the time it is detected. In this example, a probability of an event and the time duration from a previous event to a current event can be determined using the following formula:

$$f_i(p(e_i), (t_i - t_s)) = p(e_i) * \frac{1}{1 + e^{-k*((t_i - t_s) - a)}},$$

where $p(e_i)$ is the probability of an event (a micro-activity) $e_i$ happening; $t_i$ is the time at which an event $e_i$ happens; k, a are constants for normalization. In some cases, an event (or micro-activity) $e_i$ can include a walking-to-stop event, a stop-to-walking event, a car-entering event, a car vibration event, etc. In the above equation, $f_i(p(e_i), (t_i-t_s))$ represents a normalization of the probability $p(e_i)$ with the time duration $(t_i-t_s)$.

In some cases, a final probability of each event can be a combination of the probability of the event and the time when it is detected. In some cases, a probability of a combination of multiple events can be calculated using the following formula:

$$P_{x,y}(e_{i1}, e_{i2}, e_{i3}, \ldots) = \max(w_{i11}*f(e_{i1}), w_{i12}*p(f(e_{i1})|f(e_{i2})), \ldots)$$

In the above equation, $P_{x,y}$ indicates a probability of transition from event (x) to event (y); $e_{i1}$, $e_{i2}$, and $e_{i3}$ mean an event $e_1$, an event $e_2$, and an event $e_3$ that happens at time $t_1$; $w_{i11}$ means a weight of a transition from event $e_1$ to event $e_1$ at time $t_i$; $w_{i12}$ means a weight of a transition from event $e_1$ to event $e_2$ at time $t_i$; $f(e_{i1})$ represents a probability of event $e_i$ that happens at time $t_1$; $p(f(e_{i1})|f(e_{i2}))$ represents a conditional probability that indicates a probability of event $e_1$ given that event $e_2$ has occurred at time $t_i$.

In some cases, a transition matrix $A=(a_{x,y})=(P_{x,y})$, and an observation probability matrix $B=(b_{i,j})$ can be trained based on the above HMM model by using sampling driving data set. Here, $a_{x,y}$ indicates a transition that happens from event $e_x$ to event $e_y$; $P_{x,y}$ indicates a possibility of a transition that happens from event $e_x$ to event $e_y$.

Figure 9:
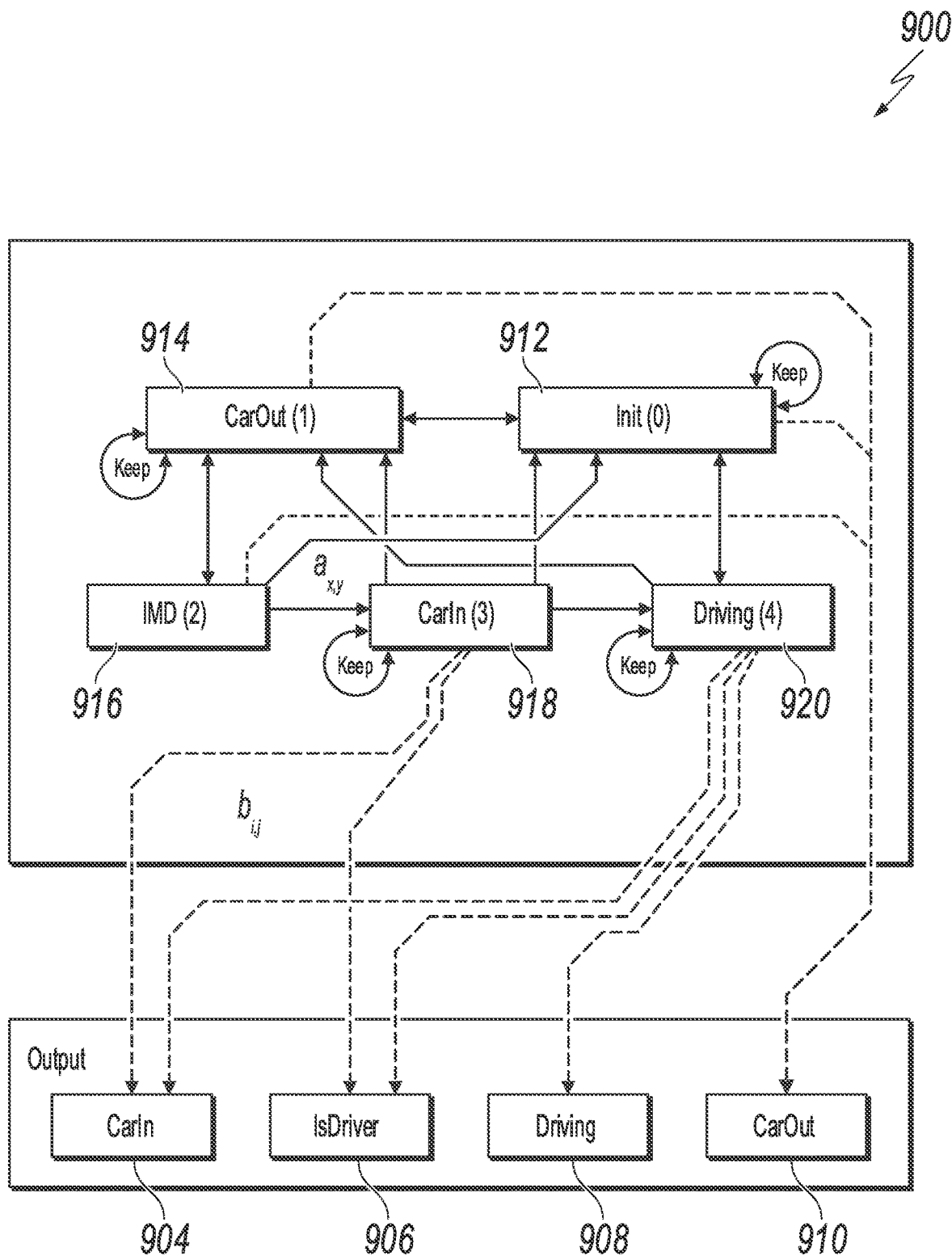
FIG. 9 shows an example of Hidden Markov Model (HMM) model in driver detection according to an embodiment of the present disclosure.

FIG. 9 shows an example of HMM model 900 in driver detection according to an embodiment of the present disclosure. As shown, the HMM model 900 includes five input states including "Init" 912, "CarOut" 914, "IMD" 916, "CarIn" 918, and "Driving" 920, where "Init" indicates the start of the algorithm, "CarOut" indicates the user is out of the car, "IMD" indicates an intermediate state (e.g., stop, starting to sit in the car, open door, sitting in the car), "CarIn" indicates the user is in the car, and "Driving" indicates the user is driving the car. The HMM model 900 also includes four output states: "CarIn" 904, "IsDriver" 906, "Driving" 908, and "CarOut" 910.

Table 1 shows an example transition matrix A.

TABLE 1

Transition Matrix A

| Previous | Next | | | | |
|---|---|---|---|---|---|
| | 0 (Init) | 1 (CarOut) | 2 (IMD) | 3 (CarIn) | 4 (Driving) |
| 0 (Init) | Keep | S2W | N/A | N/A | Driving event |
| 1 (CarOut) | TimeOut | Walking | W2S | N/A | N/A |
| 2 (IMD) | TimeOut | S2W | Keep until TimeOut | CarEnter plus Posture | N/A |
| 3 (CarIn) | TimeOut | S2W | N/A | Keep until TimeOut | Driving Event |
| 4 (Driving) | TimeOut | S2W | N/A | N/A | Driving Event |

In table 1, S2W is short for Stop-to-Walking, W2S is short for Walking-to-Stop, and both come from Walking/stop detection. The Driving event comes from turn/vibration/braking/acceleration detection module. In one example, if a previous event is "0(Init)" and an activity "Stop2Walking" (or "S2W") is detected, the next state may be determined as "1(CarOut)" according to the transition matrix A.

Using the above driver detection HMM model and multiple-sensor fusion, walk/stop feature, motion detection, multiple sensor fusion, gesture recognition, as well as rule-based pattern recognition can be achieved to discriminate such a series of micro-activities based on sensors embedded in smartphone devices. In some cases, the main models can be separated into five function divisions, where each of them includes multiple smaller models to detect individual features. These models will be described in detail below with reference to FIG. 10.

Figure 10:
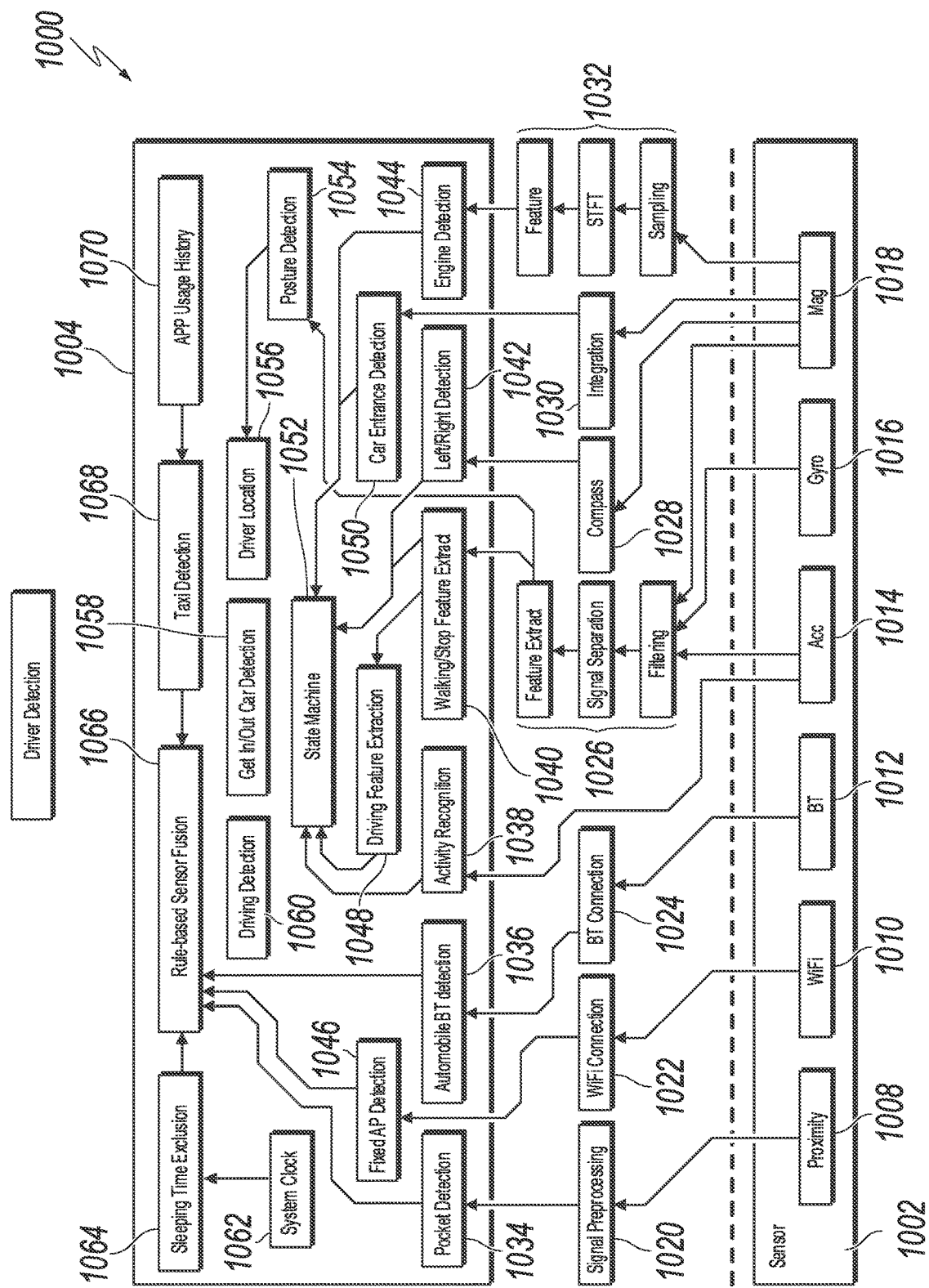
FIG. 10 shows an example of algorithm architecture for driver detection according to an embodiment of the present disclosure.

FIG. 10 shows an example of algorithm architecture 1000 for driver detection according to an embodiment of the present disclosure. In general, a driver detection algorithm includes five main function divisions including motion detection, driver location detection, driver feature detection, false alarm elimination, and context-based sensor fusion. In this example, the algorithm architecture 1000 includes a get in/out car detection component 1058 for motion detection. In some cases, the get in/out car detection component 1058 determines whether a user is getting in/out of a car. In some cases, the motion detection function includes multiple sub-functions/modules. In this example, the get in/out car detection component 1058 includes a walking/stop feature detection component 1040, an engine detection component 1044, and a car entrance detection component 1050. In some cases, the car entrance detection is based on a presumption that a person will walk for a while before opening the car door and getting into the car. In some cases, the walking/stop feature detection can differentiate walking patterns from other activities such as sitting down and hand moving activities.

In this example, the algorithm architecture 1000 includes a driver location detection component 1056. In some cases, the driver location detection component 1056 can determine a location of the user and determine whether the user is a driver. In this example, the driver location detection component 1056 includes multiple sub-components including a left/right detection component 1042, a posture detection component 1054.

The algorithm architecture 1000 further includes a driving feature detection component 1060. In some cases, the driving feature detection component 1060 can determine whether a car is braking, accelerating, turning, and/or vibrating. In this example, the driving feature detection component 1060 includes multiple sub-components including a braking detection sub-component, an acceleration detection sub-component, a vibration detection sub-component, and a turning detection sub-component.

In some cases, the driver detection algorithm includes a false alarm elimination function. In this example, the false alarm elimination function can be implemented using a sleeping time exclusion component 1064, an automotive Bluetooth detection component 1036, a WiFi access point (AP) detection component 1046, a taxi detection component 1068, a pocket detection component 1034, and a holster (e.g., phone case) detection component.

The algorithm architecture 1000 further includes a rule-based sensor fusion component 1066. In some cases, the sensor fusion component 1066 combines with multiple sensor inputs into a context-based model to output the recognition result to an upper layer.

The algorithm architecture 1000 further includes sensors such as proximity sensor 1008, WiFi module 1010, Bluetooth module 1012, accelerometer 1014, gyroscope sensor 1016, and magnetic sensor 1018. In some cases, data collected by these sensors may be further processed. In this example, signal preprocessing 1020 may be performed on data collected by the proximity sensor 1008 for pocket detection. WiFi connection 1022 and Bluetooth connection 102 may be established by the WiFi module 1010 and BT module 1012 to perform fixed AP detection and automobile BT detection. Signal filtering, separation, and feature extraction 1026 may be performed on the accelerometer, gyroscope, and magnetic sensor output signals for further walking/stop feature extraction. A compass function 1028 may be applied to the magnetic sensor output for left-right detection. An integration operation 1030 may be performed on the magnetic sensor output for car entrance detection. Further operations 1032 including sampling, STFT (short-term Fourier transform, which is used to calculate features from frequency domain over time domain), and feature modeling (e.g., trained model with the calculation from frequency domain over time domain using STFT) may be performed on the magnetic sensor output for engine detection. The individual detection components as described above will be described in greater detail below with reference to FIGS. 11-21.

Figure 11:
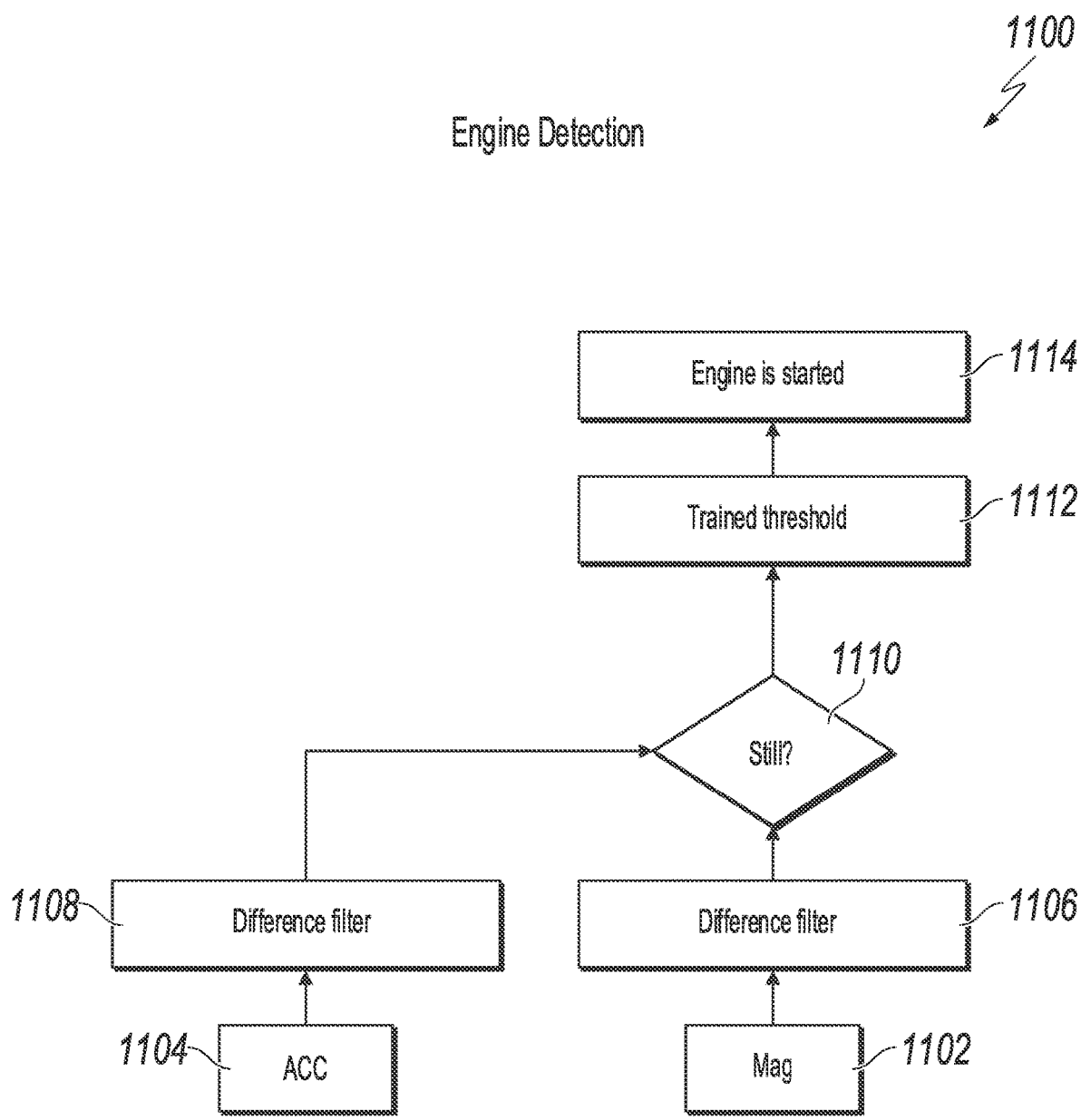
FIG. 11 shows an example of engine detection method according to an embodiment of the present disclosure.

FIG. 11 shows an example of engine detection method 1100 according to an embodiment of the present disclosure. In general, engine detection includes detecting whether an engine is starting by detecting an electromagnetic pulse from a starter motor that starts an engine. In some cases, such electromagnetic pulse may happen only once during the engine starting phase and could be interfered with by aggressive motion. As such, stillness detection can be performed to detect whether a smartphone is in a significant movement or not. In some cases, if it is detected that the smartphone is not in a significant movement, a difference filter can be triggered to detect a sharp pulse that comes from the starter. If a sharp pulse is detected, then such a feature may be reported.

At steps 1102 and 1104, data from the accelerometer and magnetic sensor are collected respectively. At 1106, data from the magnetic sensor is processed by a first difference filter. In some cases, the first difference filter may be used to calculate the difference of the stream data from the magnetic sensor. At 1108, data from the accelerometer is processed by a second difference filter. In some cases, the second difference filter may be used to calculate the difference of the stream data from the accelerometer. At 1110, based on the outputs from the two difference filters, a stillness detection is performed to detect whether a smart device is in a significant movement. In one example, a stillness detection may be performed by determining when outputs from both the first and second difference filters are smaller than a trained threshold. If it is detected that the smartphone is not in a significant movement, a sharp pulse that comes from starter can be detected. At 1112, if the smart device is in a significant movement and a sharp pulse that comes from the starter is detected, the sharp pulse is compared with a trained threshold. At 1114, if the sharp pulse exceeds the trained threshold, it is determined that the engine is started.

Figure 12:
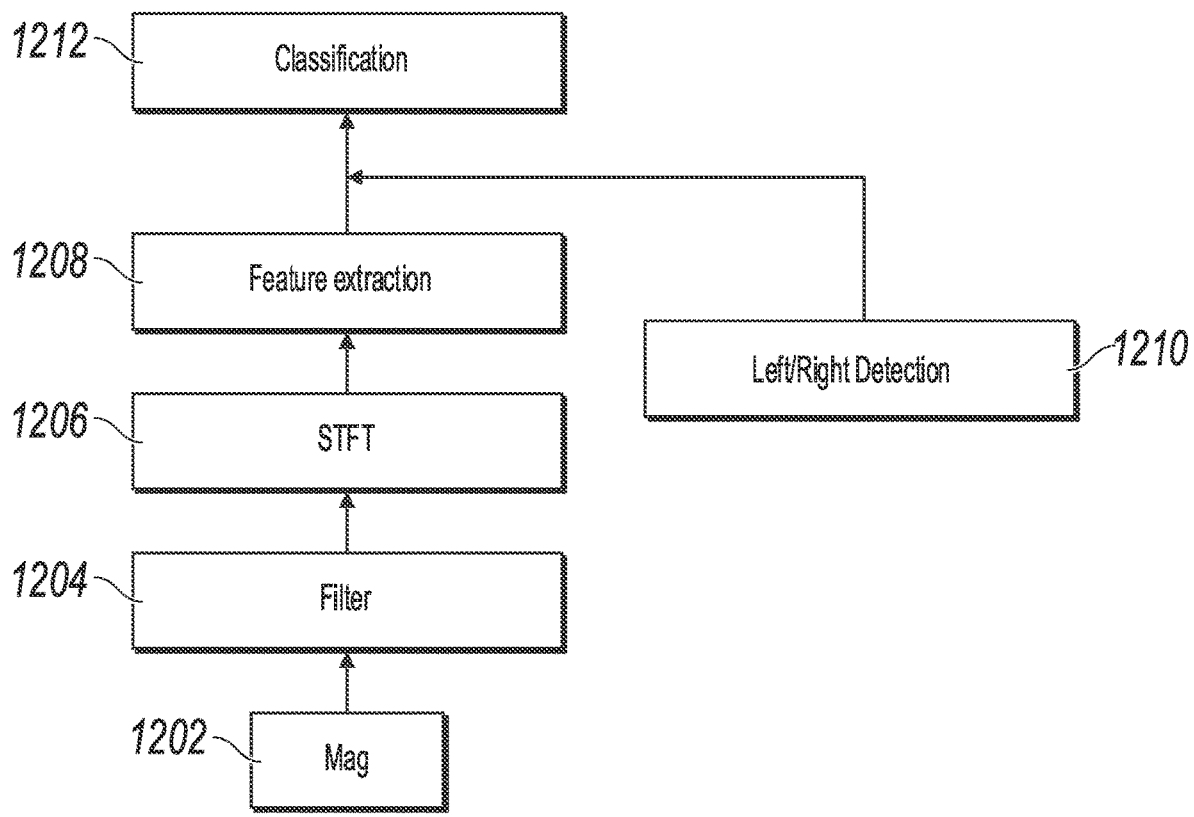
FIG. 12 shows an example of car entrance detection method according to an embodiment of the present disclosure.

FIG. 12 shows an example of car entrance detection method 1200 according to an embodiment of the present disclosure. In some cases, car entrance detection is based on an observation that a person (or user) will walk and stop before a car. When entering the car, the user may turn in order to sit on the seat. In some cases, a strong magnetic field can exist around the car frame that includes doors. As such, entering a car may involve a significant magnetic change.

At 1202, data from the magnetic sensor is collected. In some cases, the magnetic sensor includes a magnetometer that measures the strength and direction of magnetic fields. At 1204, a filter is applied to the magnetic sensor data to generate a filtered signal. In some cases, the filter is a band-pass Butterworth filter. At 1206, an STFT (short-term Fourier transform) operation is performed on the filtered signal. At 1208, a feature extraction is performed on the signal output from the STFT operation. In some cases, the extracted features are trained based on labeled data and may include frequency spectrum, standard deviation, mean, etc. At 1210, a left-right detection is performed to determine whether the user is making a left turn or right turn. This left-right turn will be described below in greater detail with reference to FIG. 13. At 1212, the results from the feature extraction operation and left/right detection are processed by a classification operation. In one example, the classification operation is performed according to the J48 classification algorithm.

Figure 13:
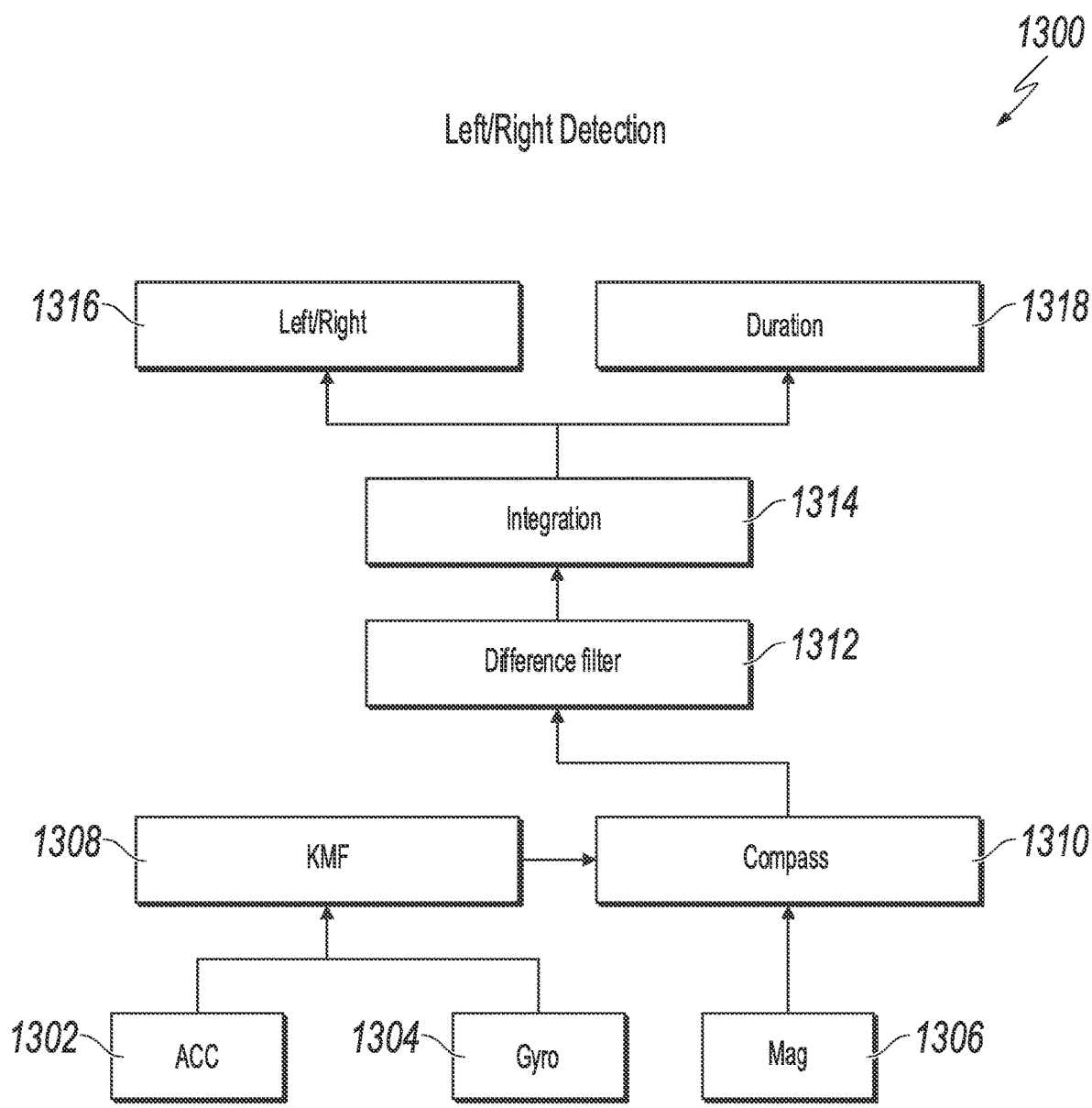
FIG. 13 shows an example of left/right detection method according to an embodiment of the present disclosure

FIG. 13 shows an example of left/right detection method 1300 according to an embodiment of the present disclosure. In some cases, left/right detection may rely on IMU-compensated compass to detect the difference of turn over time. In some cases, it is determined whether the most recent turn is right or left based on whether the difference is negative or positive. In some cases, it is determined how long such a turn was made.

At 1302, 1304, and 1306, data from the accelerometer, gyroscope, and magnetic sensor are collected respectively. At 1308, a KMF (Kalman/map filtering) operation is performed on data collected from the accelerometer and the gyroscope. At 1310, a compass processes the result from the KMF operation and the data collected from the magnetic sensor to detect an orientation of the smart device. In some cases, the compass includes an IMU-compensated compass. In some cases, the compass may be used to determine a degree a user turned. At 1312, a difference filter is applied to the output of the compass to determine a difference of a stream data of the compass. At 1314, an integration calculation is performed on the filtered signal from the difference filter. At 1316, it is determined whether the most recent turn is left or right. In some cases, determining whether the most recent turn is left or right is based on whether the difference is positive or negative. At 1318, a time duration of the turn is determined.

Figure 14:
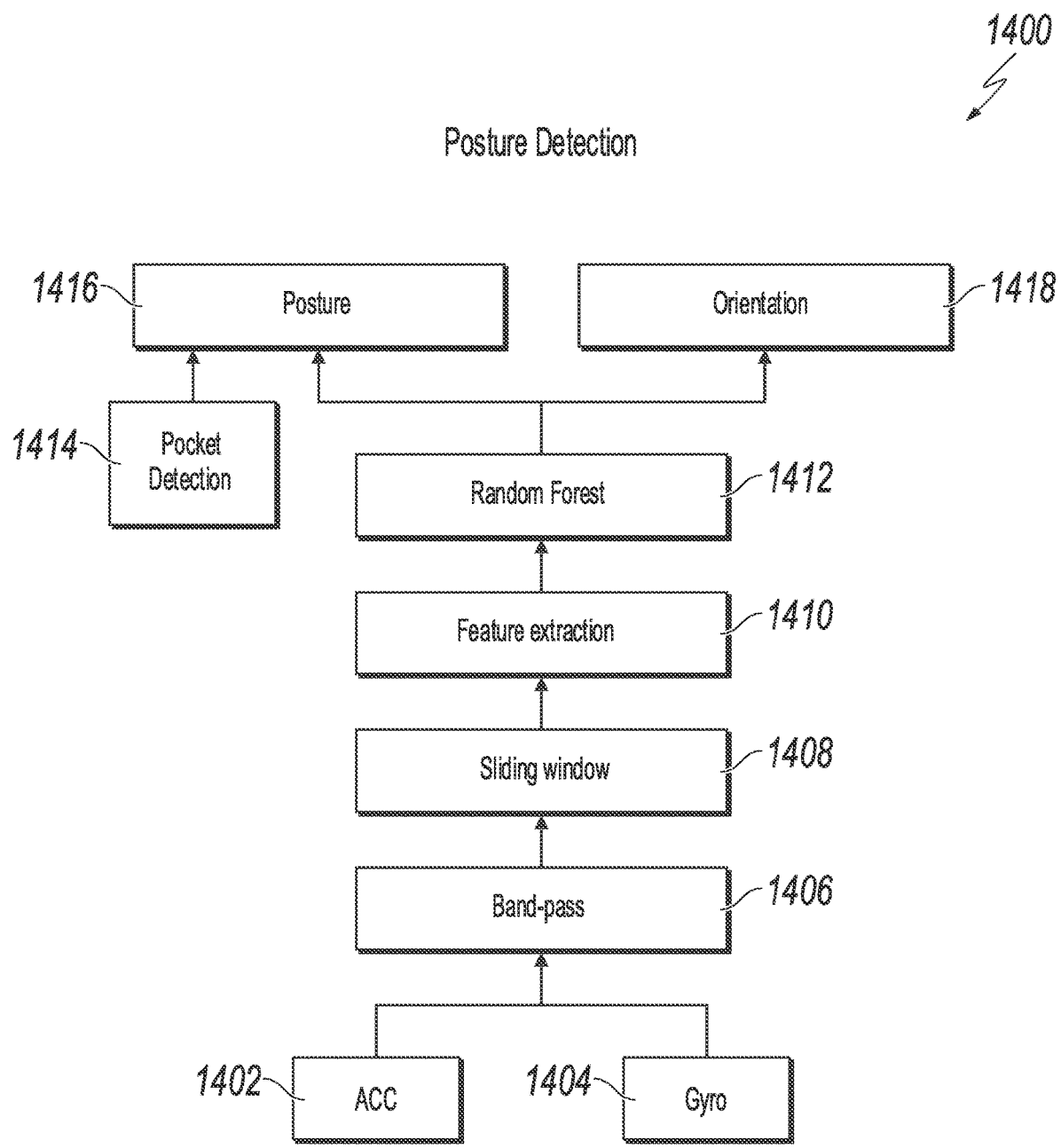
FIG. 14 shows an example of posture detection method according to an embodiment of the present disclosure

FIG. 14 shows an example of posture detection method 1400 according to an embodiment of the present disclosure. At the outset, after a driver enters a car, the driver usually places the smartphone somewhere such as in a phone-holder or in a cup holder, if the smartphone is not inside a pocket.

At 1402 and 1404, data from the accelerometer and gyroscope are collected respectively. At 1406, a band-pass filter is applied to the data collected from the accelerometer and gyroscope to generate a filtered signal. At 1408, a sliding window filter is applied on the filtered signal from the band-pass filter. At 1410, a feature extraction is performed on the output of the sliding window filter to extract features, e.g., standard deviation, mean, etc. At 1412, a random forest classification is performed on the extracted features. At 1414, a pocket detection is performed to determine whether the smart device is in a pocket of the user. At 1416, a posture of the user is determined based on the results from the pocket detection and the random forest classification. In one example, a posture includes a motion of putting a smart device inside a cup-holder or on top of a car panel. At 1418, an orientation of the smart device is determined based on the result from the random forest classification.

Figure 15:
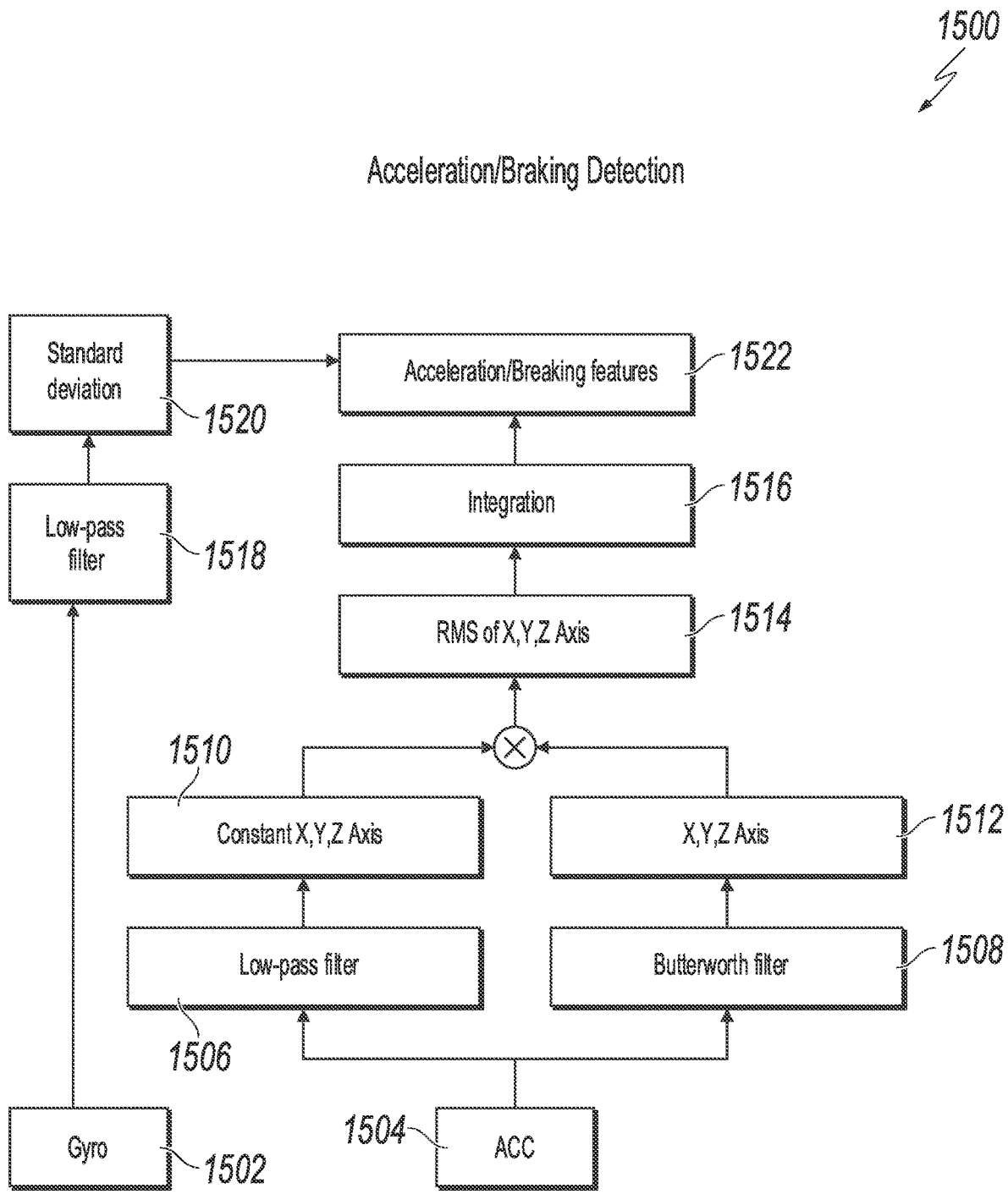
FIG. 15 shows an example of acceleration/braking detection method according to an embodiment of the present disclosure.

FIG. 15 shows an example of acceleration/braking detection method 1500 according to an embodiment of the present disclosure. In some cases, the braking and acceleration feature is detected by calculating a deceleration when the car is braking such as in front of a stop sign or traffic lights, or rapid acceleration after pushing down on the gas pedal. In some cases, it is determined based on the magnitude of the acceleration signal that is orthogonal to the gravity direction. In some cases, it may be verified that the gyroscope magnitude is minimal to ensure the accelerations are due to linear braking/accelerating, not turning.

At 1502 and 1504, data from gyroscope and accelerometer are collected respectively. At 1506 and 1508, a low-pass filter and a Butterworth filter are applied to the data collected from the accelerometer to generate filtered signals. At 1510 and 1512, outputs of the low-pass filter and the Butterworth filter are obtained respectively. At 1514, an RMS operation is performed on the outputs of the low-pass filter and the Butterworth filter to generate a normalized signal. At 1516, an integration calculation is performed on the normalized signal. At 1518, a low-pass filter is applied to the data collected from the gyroscope to generate a filtered signal. At 1520, the standard deviation of the filtered signal from the low-pass filter is calculated. At 1522, acceleration/braking features are determined based on the results from the standard deviation calculation and the integration calculation. In some cases, acceleration/braking features may include a series of features that are related to the activity that a moving car is accelerating or braking.

Figure 16:
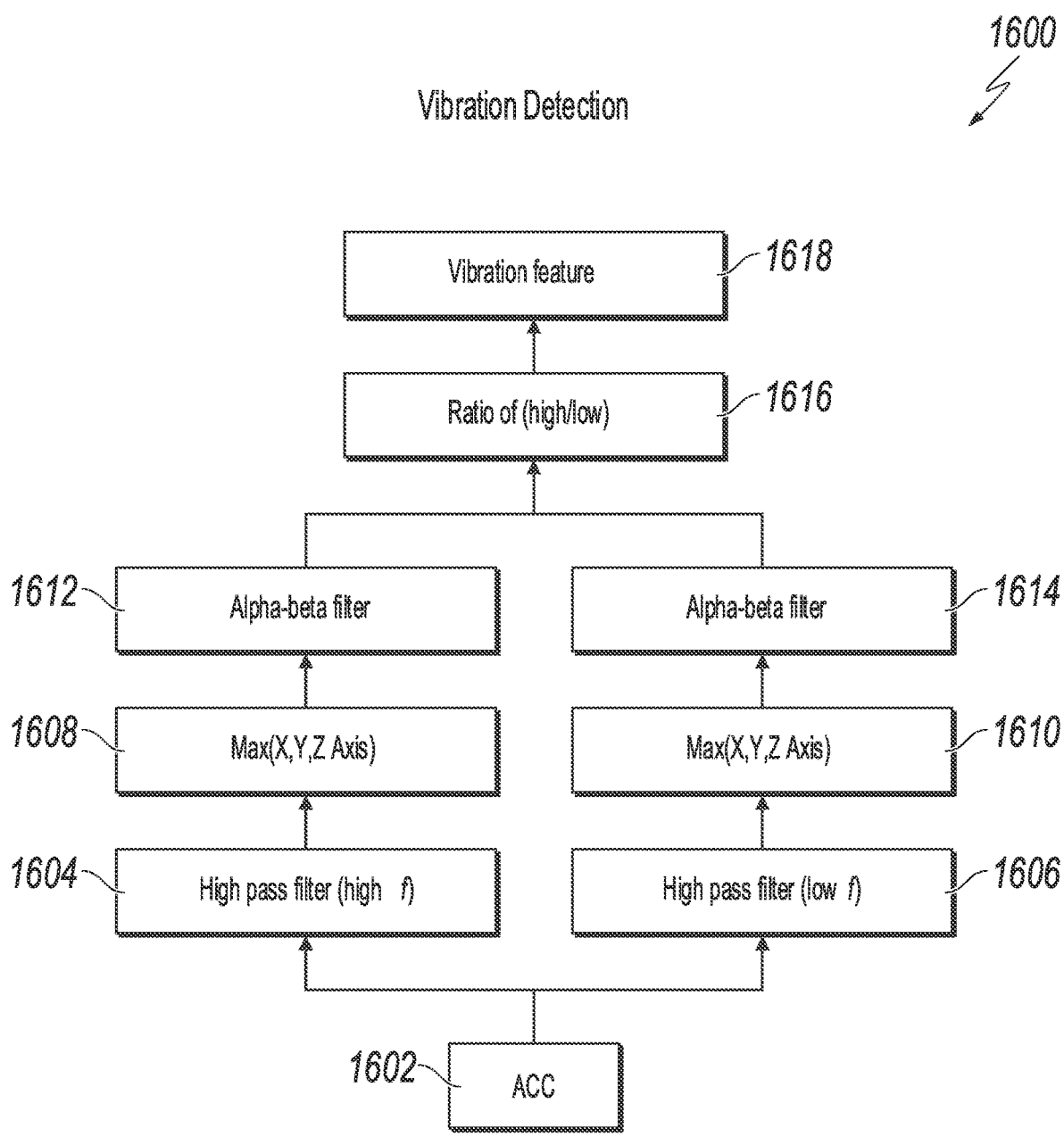
FIG. 16 shows an example of car vibration detection method according to an embodiment of the present disclosure.

FIG. 16 shows an example of car vibration detection method 1600 according to an embodiment of the present disclosure. Generally, vibration feature is determined based on a ratio of vibration in high frequency (HF) to vibration in low frequency (LF) and that vibration when driving mainly comes from the road. In some cases, vibration is determined in specific ranges of lower and higher frequency energies, as well as generally higher HF/LF ratios than other activities.

At 1602, data is collected from the accelerometer. At 1604 and 1606, a high pass filter and a low pass filer are applied to the data collected from the accelerometer respectively. In some cases, the high pass filter has a higher cut-off frequency than the low pass filter. In one example, the high pass filter has a cut-off frequency of 10 Hz, and the low pass filter has a cut-off frequency of 5 Hz. At 1608 and 1610, max values of the outputs of the high pass filter with high cut-off frequency and the high pass filter with low cut-off frequency are calculated respectively. At 1612, a first alpha-beta filter is applied to the signal. In one example, the first alpha-beta filter has an alpha value of 1.0. At 1614, a second alpha-beta filter is applied to the signal. In this example, the second alpha-beta filter has an alpha value of 5.0. At 1616, a ratio of high frequency to low frequency is determined based on the results from the two alpha-beta filters. At 1618, a vibration feature is determined based on the determined HF/LF ratio.

Figure 17:
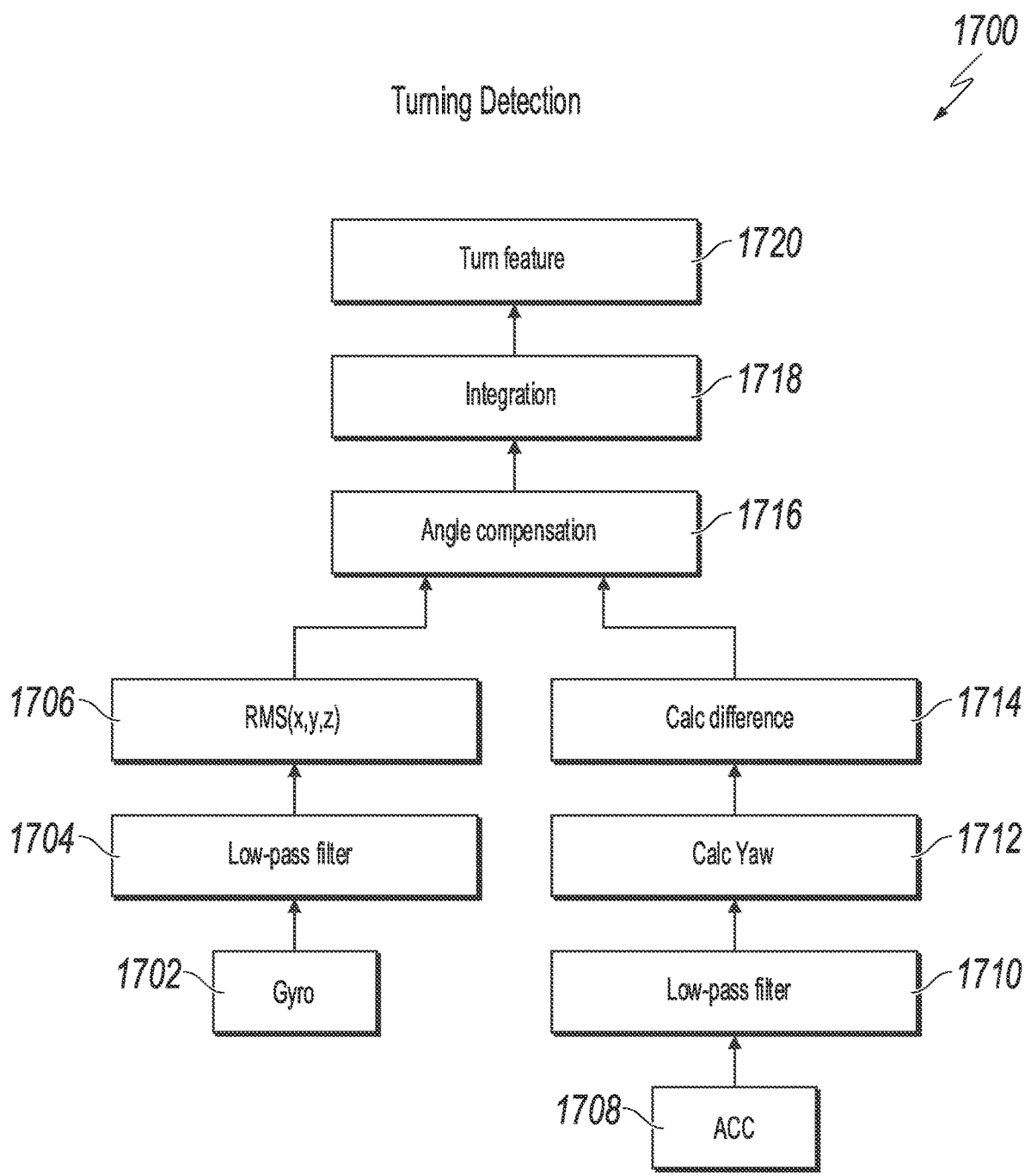
FIG. 17 shows an example of car turning detection method according to an embodiment of the present disclosure.

FIG. 17 shows an example of car turning detection method 1700 according to an embodiment of the present disclosure. In some cases, a turning feature generally comes from integrating a series of micro-turning detected by a gyroscope over a constant time period. In some cases, the smoothness of the turns may be evaluated. In some cases, bounded maximal angular velocities of the turns may be evaluated. In some cases, turns that closely rotate about an axis close to the direction of gravity are evaluated.

At 1702, data from the gyroscope is collected. At 1704, a low-pass filter is applied to the data collected from the gyroscope. At 1706, an RMS operation is performed on the result from the low-pass filter. At 1708, data from the accelerometer is collected. At 1710, a low-pass filter is applied to the data collected from the accelerometer. At 1712, Yaw is determined based on the result from the low-pass filter. In some cases, a standard yaw calculation algorithm is used to determine rotation around the yaw axis. At 1714, a difference of the result from the yaw calculation is determined. In some cases, the difference may be determined by subtracting a current yaw calculation result from a previous yaw calculation result. At 1716, an angle compensation is applied based on the result from the RMS and the determined difference. At 1718, an integration calculation is performed. At 1718, a turn feature is detected. In some cases, the turn feature may include the duration as well as the degree a user has turned at the duration.

Figure 18:
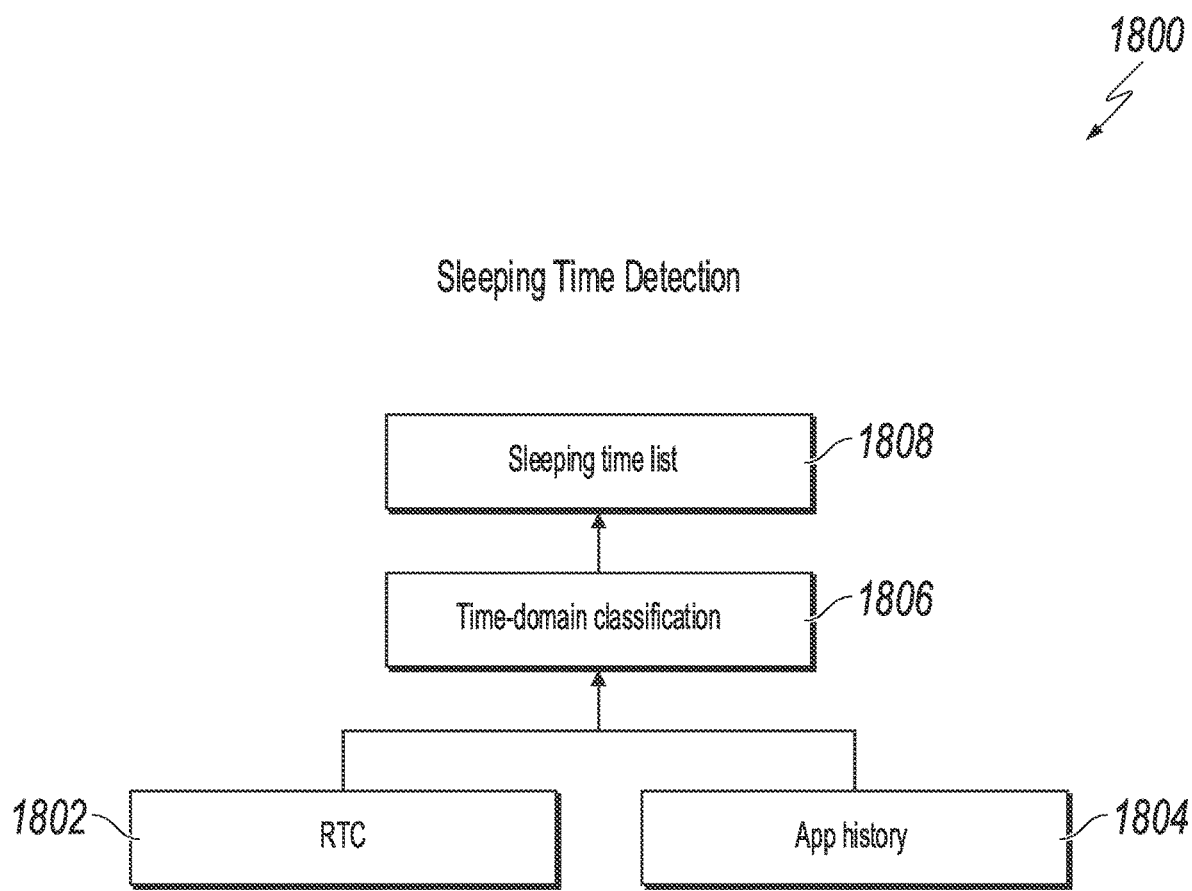
FIG. 18 shows an example of sleeping time exclusion method according to an embodiment of the present disclosure.

FIG. 18 shows an example of sleeping time exclusion method 1800 according to an embodiment of the present disclosure. In some cases, sleeping time exclusion includes detecting a sleeping time by monitoring usage of applications and RTC (real-time controller) and identifying the range of sleeping time based on the history of usage. In some cases, if the current time is falling into the range of detected sleeping time, the report of driver detection event may be suppressed in a big probability.

At 1802 and 1804, data from RTC and app history are collected. In some cases, data from RTC includes a current real world time, and data from the app history includes usage history of any available transportation applications. At 1806, a time-domain classification is performed on the data collected from the RTC and app history. In some cases, sleeping time may be determined based on the time-domain classification. In some cases, the time-domain classification is based on history sleeping time from a sleeping detection algorithm. At 1808, a sleeping time list is determined based on the result from the time-domain classification. In some cases, if a current time is falling into the range of list of sleeping time, the report of driver detection event may be suppressed.

Figure 19:
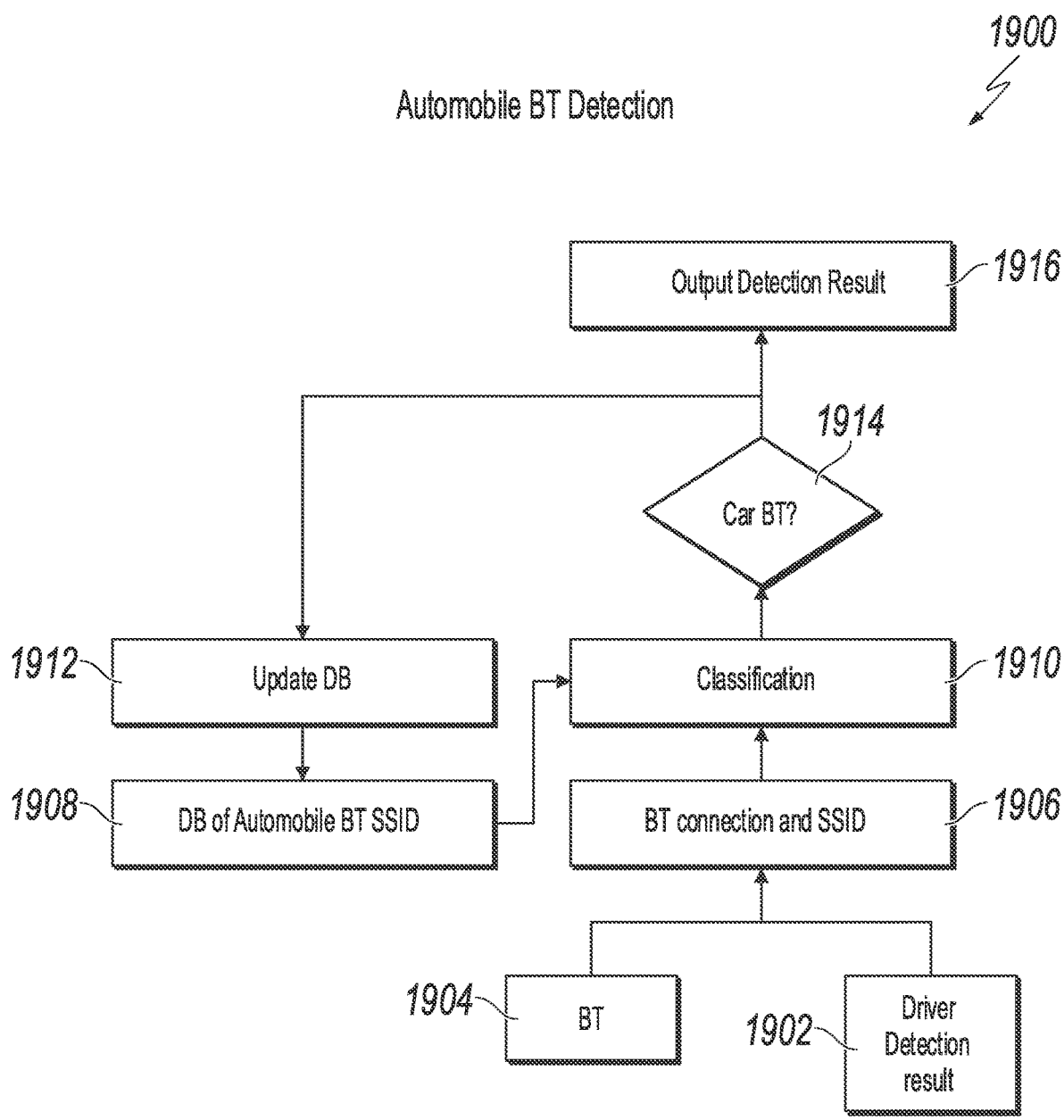
FIG. 19 shows an example of automotive Bluetooth detection method according to an embodiment of the present disclosure.

FIG. 19 shows an example of automotive Bluetooth detection method 1900 according to an embodiment of the present disclosure. In some cases, automotive Bluetooth detection may include collecting the Bluetooth connection info and its SSID and performing a classification based on the SSID and a local database of automotive BT SSID to decide whether this SSID belongs to a car.

At 1902, a driver detection result is obtained. In some cases, the driver detection result includes a result indicating whether a user is a driver or not based on the algorithm as described herein. At 1902, a BT connection is established. At 1904, BT connection information and SSID of the BT connection can be determined based on the BT connection and the driver detection result. At 1908, a database of automobile BT SSID is accessed. In some cases, a list of automobile BT SSIDs are obtained from the database. At 1910, a classification is performed based on the SSID of the BT connection and the information obtained from the database of the automobile BT SSID. At 1912, it is determined whether the BT connection SSID belongs to a car based on the classification. At 1914, an automobile BT detection result is generated.

Figure 20:
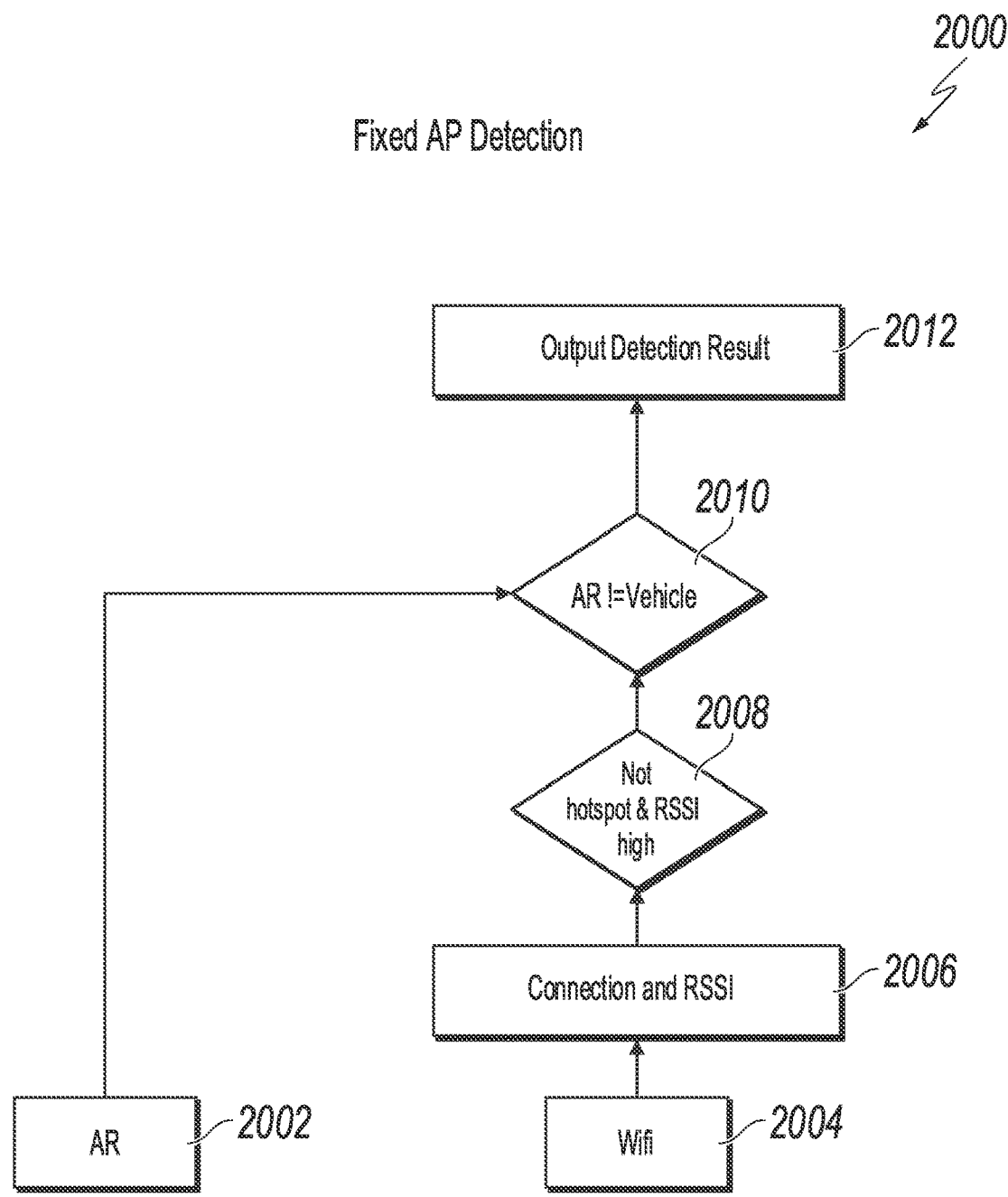
FIG. 20 shows an example of fixed WiFi access point (AP) detection method according to an embodiment of the present disclosure.

FIG. 20 shows an example of fixed WiFi AP detection method 2000 according to an embodiment of the present disclosure. In some cases, fixed WiFi AP detection includes determining whether the AP is a hotspot, whether a received signal strength indicator (RSSI) of the AP is high, and whether a current activity recognition output is equal to "in vehicle."

At 2002, activity recognition is performed to determine whether a smart device/a user is still, walking, or running, etc. At 2004, a WiFi connection is established between a smart device and an AP. At 2006, the WiFi connection is detected and an RSSI of the AP is determined. At 2008, it is determined whether the AP is a hotspot and whether the RSSI is high. In one example, a high RSSI of a signal means that the signal is more than 2 out of 5 RSSI. At 2010, if the AP is not a hotspot and the RSSI is high, it is determined whether the current activity recognition output is equal to "in vehicle." At 2012, if the current activity recognition output is not equal to "in vehicle," a fixed WiFi AP detection result is generated. In this example, the detection result may indicate whether the user is a driver or not.

Figure 21:
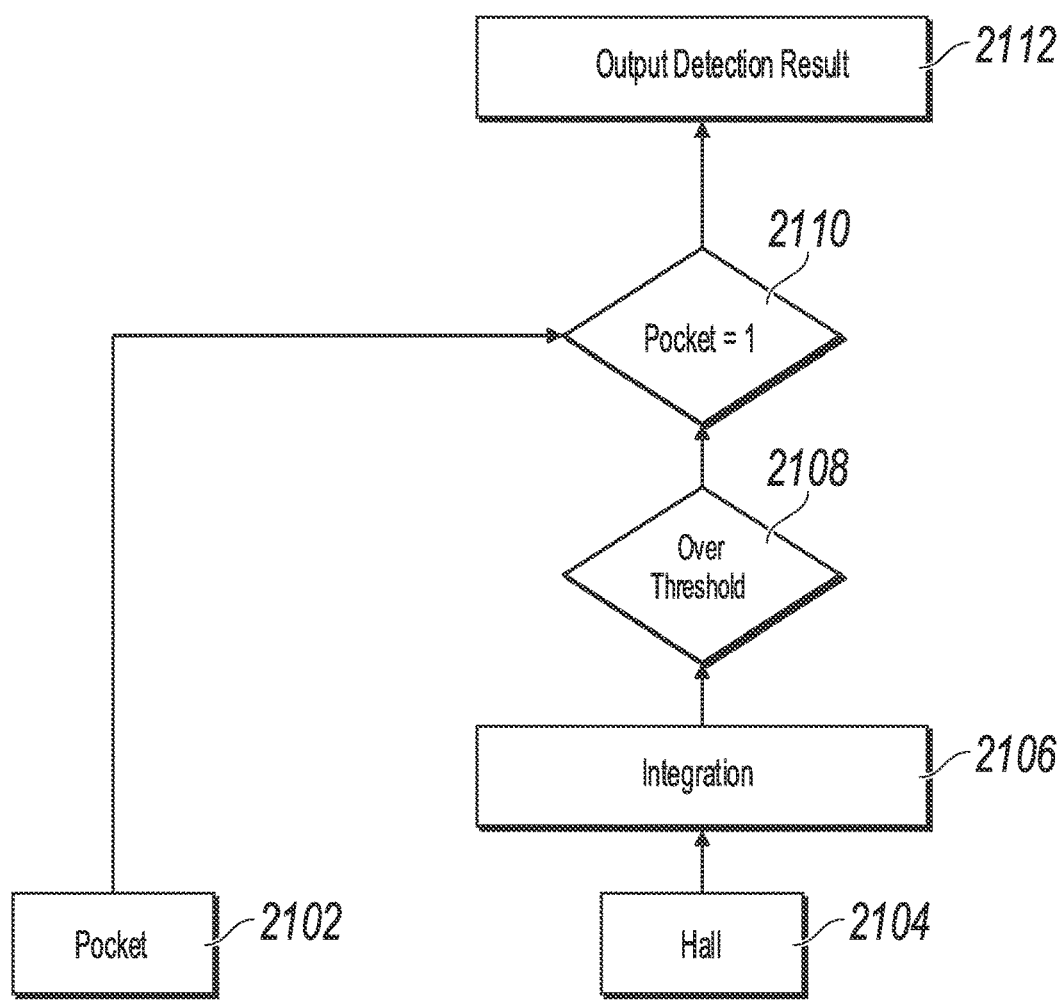
FIG. 21 shows an example of holster detection method according to an embodiment of the present disclosure.

FIG. 21 shows an example of holster detection method 2100 according to an embodiment of the present disclosure. In some cases, the holster detection is based on a hall sensor to detect whether a phone is covered by a holster.

At 2012, a pocket detection is performed to determine whether a smart device is in a pocket. At 2104, data from a hall sensor is collected. In some cases, the hall sensor may be used to detect whether a holster is used for the smart device. If it is determined that a holster is used for the smart device, the pocket detection at 2102 may be disabled. At 2106, an integration calculation is performed on the data collected from the hall sensor. At 2108, it is determined whether the result from the integration calculation is above a predetermined threshold. At 2110, it is determined whether the smart device is in a pocket based on the pocket detection at 2012. At 2112, a detection result is generated. In some cases, the detection result may indicate that the smart device is in a holster and that the pocket detection can be disabled.

The methods as described in the present disclosure has many technical features. For example, the faster walking to stop detection as described herein has a short delay and is suitable for driver detection. In some embodiments of the present disclosure, an engine detection method as described is based on motion-augmented magnetometer signal sensing. In some embodiments, a car entrance detection method as described is based on a sequential of magnetic signal and compass direction changes. In some embodiments, a dynamic cup-holder posture recognition for smartphones is proposed by crossing multiple frames using accelerometer and gyroscope. In some embodiments, car-related driving features are described to detect turning, braking, and vibration events within a short time (e.g., one or two minutes) of the car starting to drive. In some embodiments, a state machine is built to recognize the micro-activities of driving detection more efficiently. In some embodiments, the state machine mimics natural micro-activities that can happen when the user enters a car and start to drive. In some embodiments, the state transitions of the state machine depend on proposed novel features as a trigger, as well as fuses activity recognition results to improve efficiency. In some embodiments, a sensor fusion method as described includes multiple modules to increase detection accuracy and eliminate false alarms. In some embodiments, automotive Bluetooth detection is performed based on a self-learning algorithm, which can greatly reduce false alarms when using a car Bluetooth connection. In some embodiments, driver detection is suppressed when the smartphone is detected in a pocket, except that the case when the smartphone is further detected as covered by a holster. In some embodiments, false alarm reduction methods as described leverage fixed WiFi connection, app usage, and sleeping time contexts.

Figure 22:
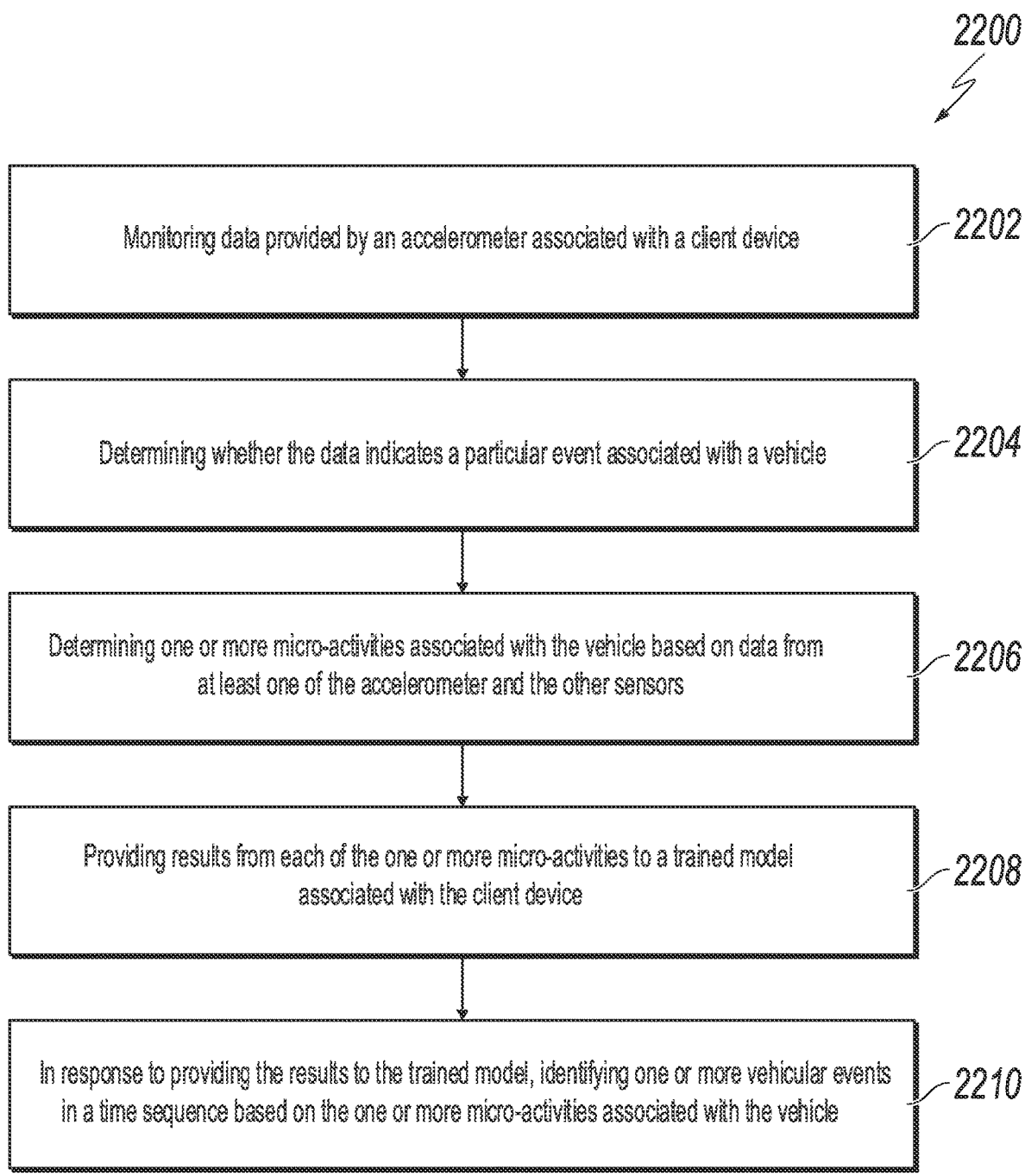
FIG. 22 is a flow chart illustrating an example of driver detection method according to an embodiment of the present disclosure.

FIG. 22 is a flow chart illustrating an example of driver detection method 2200 according to an embodiment of the present disclosure. In some cases, the method 200 may be implemented by the user device 104 of FIG. 1.

The process 2200 starts at 2202 where data provided by an accelerometer associated with a client device is monitored. In some cases, the client device may be a mobile device or a smart wearable device.

At 2204, it is determined whether the data indicates a particular event associated with a vehicle. In some cases, the particular event associated with the vehicle may include a time sequence of events including a user walking toward a vehicle, the user stopping at the vehicle, the user entering the vehicle, and the vehicle moving.

In some cases, in response to determining that the data indicates the particular event associated with the vehicle, one or more other sensors associated with the client device are powered on. In some cases, the one or more other sensors include a system clock, a proximity sensor, an accelerometer, a gyroscope, a magnetic sensor, a Bluetooth indicator, and a WiFi indicator. In some cases, these sensors may be powered on automatically when the vehicle or the client device has started.

At 2206, one or more micro-activities associated with the vehicle are determined based on data from at least one of the accelerometer and the other sensors. In some cases, the one or more micro-activities are determined by determining whether a user of the client device is getting into the vehicle, whether the user is getting out of the vehicle, whether an engine of the vehicle has started.

In some cases, the one or more micro-activities are determined by determining whether a left turn or a right turn was made by the vehicle. In some cases, if it is determined that the left turn or the right turn was made by the vehicle, a period of time in which the vehicle made the left turn or right turn may be determined.

In some cases, the one or more micro-activities are determined by determining a posture detection of the client device in the vehicle. In some cases, the posture detection of the client device corresponds to the client device being located in a cup holder within the vehicle or connected to a phone holder within the vehicle. In some cases, the client device is not inside the pocket of a user.

In some cases, the one or more micro-activities are determined by determining a deceleration amount of the vehicle while the vehicle remains in motion and an acceleration amount of the vehicle. In some cases, the one or more micro-activities are determined by determining the vibration of the client device as the vehicle is moving. In some cases, the one or more micro-activities are determined by determining the location of the client device in the vehicle, where the location includes a front row right seat, a front row left seat, a back row right seat, and a back row left seat.

At 2208, results from each of the one or more micro-activities are provided to a trained model associated with the client device. In some cases, the trained model includes a time decaying embedded Hidden Markov Model (HMM) state machine.

At 2210, in response to providing the results to the trained model, one or more vehicular events in a time sequence are identified based on the one or more micro-activities associated with the vehicle. In some cases, the one or more vehicular in a time sequence may include a first vehicular event representing a user is located in the vehicle, a second vehicular event representing the user is a driver of the vehicle, a third vehicular event representing the vehicle is moving, a fourth vehicular event representing the user is out of the vehicle.

Figure 23:
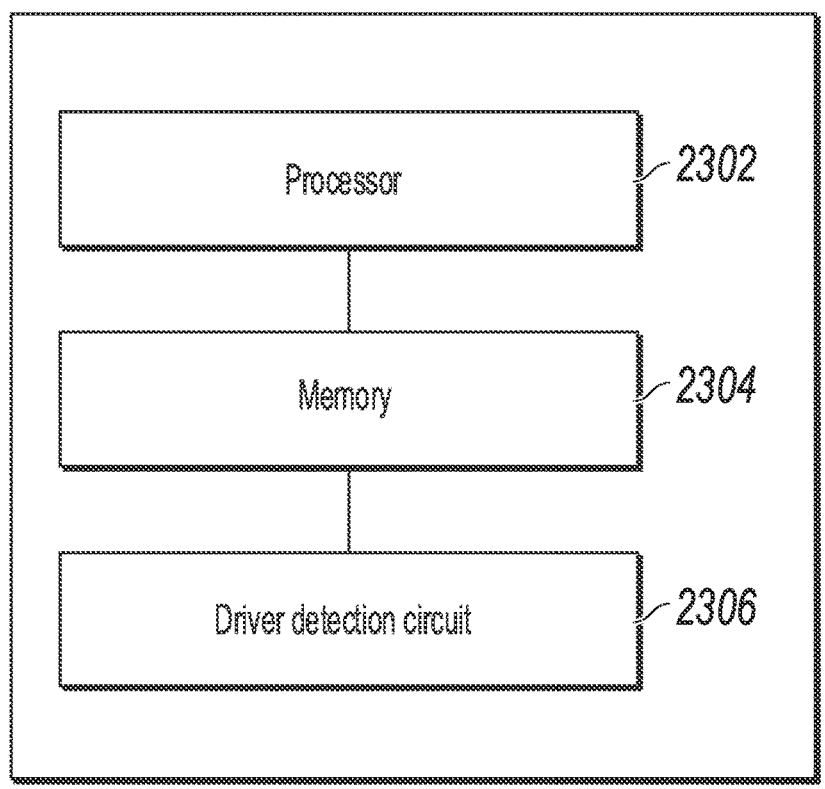
FIG. 23 is a schematic diagram illustrating an example of electronic device according to an embodiment of the present disclosure.

FIG. 23 is a schematic diagram illustrating an example of electronic device 2300 according to an embodiment of the present disclosure. The electronic device 2300 includes one or more processors 2302, a memory 2304, and a driver detection circuit 2306. In some implementations, electronic device 2300 can further include one or more circuits for performing any one or a combination of steps described in the present disclosure.

Described implementations of the subject matter can include one or more features, alone or in combination.

In a first implementation, a method includes: monitoring data provided by an accelerometer associated with the client device; determining whether the data indicates a particular event associated with a vehicle; and in response to determining that the data indicates the particular event associated with the vehicle, determining one or more micro-activities associated with the vehicle based on data from at least one of the accelerometer and one or more other sensors associated with the client device; providing results from each of the one or more micro-activities to a trained model associated with the client device; and in response to providing the results to the trained model, identifying one or more vehicular events in a time sequence based on the one or more micro-activities associated with the vehicle.

In a second implementation, an electronic device includes: anon-transitory memory storage comprising instructions; and one or more hardware processors in communication with the memory storage, wherein the one or more hardware processors execute the instructions to perform operations including: monitoring data provided by an accelerometer associated with the client device; determining whether the data indicates a particular event associated with a vehicle; and in response to determining that the data indicates the particular event associated with the vehicle, determining one or more micro-activities associated with the vehicle based on data from at least one of the accelerometer and one or more other sensors associated with the client device; providing results from each of the one or more micro-activities to a trained model associated with the client device; and in response to providing the results to the trained model, identifying one or more vehicular events in a time sequence based on the one or more micro-activities associated with the vehicle.

In a third implementation, a non-transitory computer-readable medium storing computer instructions, that when executed by one or more hardware processors, cause the one or more hardware processors to perform operations including: monitoring data provided by an accelerometer associated with the client device; determining whether the data indicates a particular event associated with a vehicle; and in response to determining that the data indicates the particular event associated with the vehicle, determining one or more micro-activities associated with the vehicle based on data from at least one of the accelerometer and one or more other sensors associated with the client device; providing results from each of the one or more micro-activities to a trained model associated with the client device; and in response to providing the results to the trained model, identifying one or more vehicular events in a time sequence based on the one or more micro-activities associated with the vehicle.

The foregoing and other described implementations can each, optionally, include one or more of the following features:

A first feature, combinable with any of the following features, where the particular event associated with the vehicle includes another time sequence of events including a user walking toward a vehicle, the user stopping at the vehicle, the user entering in the vehicle, and the vehicle moving.

A second feature, combinable with any of the previous or following features, where the one or more other sensors include a system clock, a proximity sensor, an accelerometer, a gyroscope, a magnetic sensor, a Bluetooth indicator, and a WiFi indicator.

A third feature, combinable with any of the previous or following features, where the trained model comprises a time decaying embedded Hidden Markov Model (HMM) state machine.

A fourth feature, combinable with any of the previous or following features, where determining the one or more micro-activities includes: determining whether a user of the client device is getting into the vehicle; determining whether a user of the client device is getting out of the vehicle; and determining whether an engine of the vehicle has started.

A fifth feature, combinable with any of the previous or following features, where determining the one or more micro-activities includes: determining whether a left turn or a right turn was made by the vehicle; and in response to determining whether the left turn or the right turn was made by the vehicle, determining a period of time in which the vehicle made the left turn or right turn.

A sixth feature, combinable with any of the previous or following features, where determining the one or more micro-activities includes: determining a posture detection of the client device in the vehicle, where the posture detection of the client device corresponds to the client device being located in a cup holder within the vehicle or connected to a phone holder within the vehicle, and where the client device is not inside a pocket of a user.

A seventh feature, combinable with any of the previous or following features, where determining the one or more micro-activities includes: determining a deceleration amount of the vehicle while the vehicle remains in motion; and determining an acceleration amount of the vehicle.

An eighth feature, combinable with any of the previous or following features, where determining the one or more micro-activities includes: determining a vibration of the client device as the vehicle is moving.

A ninth feature, combinable with any of the previous or following features, where determining the one or more micro-activities includes: determining a location of the client device in the vehicle, where the location includes a front row right seat, a front row left seat, a back row right seat, and a back row left seat.

A tenth feature, combinable with any of the previous features, where identifying the one or more vehicular events in the time sequence includes: obtaining a first vehicular event representing a user is located in the vehicle; obtaining a second vehicular event representing the user is a driver of the vehicle; obtaining a third vehicular event representing the vehicle is moving; and obtaining a fourth vehicular event representing the user is out of the vehicle.

Implementations of the subject matter and the functional operations described in this specification can be implemented in digital electronic circuitry, intangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," and "computer," (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a Central Processing Unit (CPU), a Field Programmable Gate Array (FPGA), or an Application-specific Integrated Circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, IOS, or any other suitable conventional operating system.

A computer program, which may also be referred to or described as a program, software, software application, module, software module, script, or code can be written in any form of programming language, including compiled or interpreted languages, or declarative or procedural languages. It can be deployed in any form, including as a stand-alone program module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed or to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a ROM or a Random Access Memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a Personal Digital Assistant (PDA), a mobile audio or video player, a game console, a Global Positioning System (GPS) receiver, or a portable storage device, for example, a Universal Serial Bus (USB) flash drive, to name just a few.

Computer-readable media (transitory or non-transitory, as appropriate) suitable for storing computer program instructions and data includes non-volatile memory, media, and memory devices, including by way of example, semiconductor memory devices, for example, Erasable Programmable Read-Only Memory (EPROM), Electrically Erasable Programmable Read-Only Memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a Cathode Ray Tube (CRT), Liquid Crystal Display (LCD), Light Emitting Diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or another type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, for example, as a data server, or one that includes a middleware component; an application server, or one that includes a front-end component; a client computer having a graphical user interface; a Web browser through which a user can interact with an implementation of the subject matter described in this specification; or any combination of one or more such back-end, middleware, or front-end components. The components of the system can be interconnected by any form or medium of wireline or wireless digital data communication (or a combination of data communication), for example, a communication network. Examples of communication networks include a Local Area Network (LAN), a Radio Access Network (RAN), a Metropolitan Area Network (MAN), a Wide Area Network (WAN), Worldwide Interoperability for Microwave Access (WiMAX), a Wireless Local Area Network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

The invention claimed is:

1. A computer-implemented method performed by a client device having one or more processors, the computer-implemented method comprising:
monitoring, by the one or more processors, data provided by an accelerometer, a magnetic sensor, and a gyroscope associated with the client device, wherein the data comprises an accelerometer sensing result, a measurement result of a magnetic field related to a vehicle, and a gyroscope measurement result;
determining, by an inertial measurement unit (IMU)-compensated compass based on the accelerometer sensing result, the measurement result of the magnetic field related to the vehicle, and the gyroscope measurement result, whether the data indicates a vehicle entrance event associated with the vehicle, wherein the vehicle entrance event comprises a user turning to sit on a seat when entering the vehicle; and
in response to determining that the data indicates the vehicle entrance event associated with the vehicle:
determining, by the one or more processors, one or more micro-activities associated with the vehicle based on data from at least one of the accelerometer, the magnetic sensor, the gyroscope, and one or more other sensors associated with the client device;
providing, by the one or more processors, results from each of the one or more micro-activities to a trained model associated with the client device; and
in response to providing the results to the trained model, identifying, by the one or more processors, one or more vehicular events in a time sequence based on the one or more micro-activities associated with the vehicle, wherein the one or more vehicular events include at least an event descriptive of a user's location relative to a vehicle, and wherein identifying the one or more vehicular events comprises identifying the one or more vehicular events based on a predetermined relationship between a plurality of vehicular events and a plurality of micro-activities, and wherein the predetermined relationship indicates that each vehicular event corresponds to a transition between two micro-activities.

2. The computer-implemented method of claim 1, wherein the one or more other sensors comprise a system clock, a proximity sensor, an accelerometer, a gyroscope, a magnetic sensor, a Bluetooth indicator, and a WiFi indicator.

3. The computer-implemented method of claim 1, wherein the trained model comprises a time decaying embedded Hidden Markov Model (HMM) state machine.

4. The computer-implemented method of claim 1, wherein determining the one or more micro-activities comprises:
determining, by the one or more processors, whether a user of the client device is getting into the vehicle;
determining, by the one or more processors, whether a user of the client device is getting out of the vehicle; and
determining, by the one or more processors, whether an engine of the vehicle has started.

5. The computer-implemented method of claim 1, wherein determining the one or more micro-activities comprises:
determining, by the one or more processors, whether a left turn or a right turn was made by the vehicle; and
in response to determining whether the left turn or the right turn was made by the vehicle, determining, by the one or more processors, a period of time in which the vehicle made the left turn or right turn.

6. The computer-implemented method of claim 1, wherein determining the one or more micro-activities comprises:
determining, by the one or more processors, a posture detection of the client device in the vehicle, wherein the posture detection of the client device corresponds to the client device being located in a cup holder within the vehicle or connected to a phone holder within the vehicle, and wherein the client device is not inside a pocket of a user.

7. The computer-implemented method of claim 1, wherein determining the one or more micro-activities comprises:
determining, by the one or more processors, a deceleration amount of the vehicle while the vehicle remains in motion; and
determining, by the one or more processors, an acceleration amount of the vehicle.

8. The computer-implemented method of claim 1, wherein determining the one or more micro-activities comprises:
   determining, by the one or more processors, a vibration of the client device as the vehicle is moving.

9. The computer-implemented method of claim 1, wherein determining the one or more micro-activities comprises:
   determining, by the one or more processors, a location of the client device in the vehicle, wherein the location comprises a front row right seat, a front row left seat, a back row right seat, and a back row left seat.

10. The computer-implemented method of claim 1, wherein identifying the one or more vehicular events in the time sequence comprises:
   obtaining, by the one or more processors, a first vehicular event representing a user is located in the vehicle;
   obtaining, by the one or more processors, a second vehicular event representing the user is a driver of the vehicle;
   obtaining, by the one or more processors, a third vehicular event representing the vehicle is moving; and
   obtaining, by the one or more processors, a fourth vehicular event representing the user is out of the vehicle.

11. An electronic device, comprising:
   a non-transitory memory storage comprising instructions; and
   one or more hardware processors in communication with the memory storage, wherein the one or more hardware processors execute the instructions to perform operations comprising:
      monitoring data provided by an accelerometer, a magnetic sensor, and a gyroscope associated with a client device, wherein the data comprises an accelerometer sensing result, a measurement result of a magnetic field related to a vehicle, and a gyroscope measurement result;
      determining, using an inertial measurement unit (IMU)-compensated compass based on the accelerometer sensing result, the measurement result of the magnetic field related to the vehicle, and the gyroscope measurement result, whether the data indicates a vehicle entrance event associated with the vehicle, wherein the vehicle entrance event comprises a user turning to sit on a seat when entering the vehicle; and
      in response to determining that the data indicates the particular event associated with the vehicle:
         determining one or more micro-activities associated with the vehicle based on data from at least one of the accelerometer, the magnetic sensor, the gyroscope, and one or more other sensors associated with the client device;
         providing results from each of the one or more micro-activities to a trained model associated with the client device; and
         in response to providing the results to the trained model, identifying one or more vehicular events in a time sequence based on the one or more micro-activities associated with the vehicle, wherein the one or more vehicular events include at least an event descriptive of a user's location relative to a vehicle, and wherein identifying the one or more vehicular events comprises identifying the one or more vehicular events based on a predetermined relationship between a plurality of vehicular events and a plurality of micro-activities, and wherein the predetermined relationship indicates that each vehicular event corresponds to a transition between two micro-activities.

12. The electronic device of claim 11, wherein the one or more other sensors comprise a system clock, a proximity sensor, an accelerometer, a gyroscope, a magnetic sensor, a Bluetooth indicator, and a WiFi indicator.

13. The electronic device of claim 11, wherein the trained model comprises a time decaying embedded Hidden Markov Model (HMM) state machine.

14. The electronic device of claim 11, wherein determining the one or more micro-activities comprises:
   determining whether a user of the client device is getting into the vehicle;
   determining whether a user of the client device is getting out of the vehicle; and
   determining whether an engine of the vehicle has started.

15. The electronic device of claim 11, wherein determining the one or more micro-activities comprises:
   determining whether a left turn or a right turn was made by the vehicle; and
   in response to determining whether the left turn or the right turn was made by the vehicle, determining a period of time in which the vehicle made the left turn or right turn.

16. The electronic device of claim 11, wherein determining the one or more micro-activities comprises:
   determining a posture detection of the client device in the vehicle, wherein the posture detection of the client device corresponds to the client device being located in a cup holder within the vehicle or connected to a phone holder within the vehicle, and wherein the client device is not inside a pocket of a user.

17. The electronic device of claim 11, wherein determining the one or more micro-activities comprises:
   determining a deceleration amount of the vehicle while the vehicle remains in motion; and
   determining an acceleration amount of the vehicle.

18. A non-transitory computer-readable medium storing computer instructions, that when executed by one or more hardware processors, cause the one or more hardware processors to perform operations comprising:
   monitoring data provided by an accelerometer, a magnetic sensor, and a gyroscope associated with a client device, wherein the data comprises an accelerometer sensing result, a measurement result of a magnetic field related to a vehicle, and a gyroscope measurement result;
   determining, using an inertial measurement unit (IMU)-compensated compass based on the accelerometer sensing result, the measurement result of the magnetic field related to the vehicle, and the gyroscope measurement result, whether the data indicates a vehicle entrance event associated with the vehicle, wherein the vehicle entrance event comprises a user turning to sit on a seat when entering the vehicle; and
   in response to determining that the data indicates the particular event associated with the vehicle:
      determining one or more micro-activities associated with the vehicle based on data from at least one of the accelerometer, the magnetic sensor, the gyroscope, and one or more other sensors associated with the client device;
      providing results from each of the one or more micro-activities to a trained model associated with the client device; and
      in response to providing the results to the trained model, identifying one or more vehicular events in a time sequence based on the one or more micro-activities associated with the vehicle, wherein the one or more vehicular events include at least an event descriptive of a user's location relative to a vehicle, and wherein identifying the one or more vehicular events comprises identifying the one or more vehicular events based on a predetermined relationship between a plurality of vehicular events and a plurality of micro-activities, and wherein the predetermined relationship indicates that each vehicular event corresponds to a transition between two micro-activities.

\* \* \* \* \*